US012082003B2

(12) United States Patent
Dussmann et al.

(10) Patent No.: US 12,082,003 B2
(45) Date of Patent: Sep. 3, 2024

(54) OPEN RADIO ACCESS NETWORK WITH UNIFIED REMOTE UNITS SUPPORTING MULTIPLE FUNCTIONAL SPLITS, MULTIPLE WIRELESS INTERFACE PROTOCOLS, MULTIPLE GENERATIONS OF RADIO ACCESS TECHNOLOGY, AND MULTIPLE RADIO FREQUENCY BANDS

(71) Applicant: CommScope Technologies LLC, Hickory, NC (US)

(72) Inventors: Alfons Dussmann, Gansheim (DE); Joerg Stefanik, Donauworth (DE); Patrick Braun, Munningen (DE); Daniel Schwab, Gersthofen (DE); Van Erick Hanson, Forest, VA (US); Suresh Natarajan Sriram, Bangalore (IN); Thomas Kummetz, Kissing (DE); Dean Zavadsky, Shakopee, MN (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 17/362,344

(22) Filed: Jun. 29, 2021

(65) Prior Publication Data

US 2021/0409977 A1 Dec. 30, 2021

Related U.S. Application Data

(60) Provisional application No. 63/064,557, filed on Aug. 12, 2020.

(30) Foreign Application Priority Data

Jun. 30, 2020 (IN) .............................. 202041027733

(51) Int. Cl.
*H04W 24/02* (2009.01)
*H04W 24/08* (2009.01)
(Continued)

(52) U.S. Cl.
CPC ........... *H04W 24/02* (2013.01); *H04W 24/08* (2013.01); *H04W 72/0453* (2013.01); *H04W 88/10* (2013.01)

(58) Field of Classification Search
CPC . H04W 24/02; H04W 24/08; H04W 72/0453; H04W 88/10
See application file for complete search history.

(56) References Cited

U.S. PATENT DOCUMENTS 6,785,558 B1  8/2004  Stratford et al.
6,801,788 B1  10/2004  Csapo et al.
(Continued)

FOREIGN PATENT DOCUMENTS

CN  104335625 A  2/2015
EP  3226496 A1  10/2017
(Continued)

OTHER PUBLICATIONS

U.S. Patent and Trademark Office, "Notice of Allowance", U.S. Appl. No. 16/663,257, dated Feb. 24, 2022, pp. 1 through 14, Published: US.

(Continued)

*Primary Examiner* — Lewis G West
(74) *Attorney, Agent, or Firm* — Fogg & Powers LLC

(57) ABSTRACT

One embodiment is directed to an open radio access network to provide wireless coverage for a plurality of cells at a site and that comprises a virtualized headend comprising one or more base-station nodes and a plurality of unified remote units deployed at the site. Each of the unified remote units is able to support multiple functional splits, multiple wireless interface protocols, multiple generations of radio access technology, and multiple frequency bands. The unified remote units and functional split used to serve each cell can be changed (for example, on-the-fly as a part of an automatic (Continued)

or manual adaptation process that is a function of one or more monitored performance attributes of the open radio access network such as network bandwidth, network latency, processing load, or processing performance). The unified remote units can be implemented in a modular manner with a backplane to which different radio modules can be coupled.

39 Claims, 11 Drawing Sheets

(51) Int. Cl.
*H04W 72/04* (2009.01)
*H04W 72/0453* (2023.01)
*H04W 88/10* (2009.01)

(56) References Cited

U.S. PATENT DOCUMENTS

| | | |
|---|---|---|
| 6,963,552 B2 | 11/2005 | Sabat, Jr. et al. |
| 7,787,854 B2 | 8/2010 | Conyers et al. |
| 8,682,338 B2 | 3/2014 | Lemson et al. |
| 8,762,510 B2 | 6/2014 | Sabat, Jr. et al. |
| 8,908,650 B2 | 12/2014 | Aarflot et al. |
| 8,929,288 B2 | 1/2015 | Stewart et al. |
| 8,937,904 B2 | 1/2015 | Machida |
| 9,125,054 B2 | 9/2015 | Ryan |
| 9,313,827 B2 | 4/2016 | Ilyadis |
| 9,380,466 B2 | 6/2016 | Eyuboglu et al. |
| 9,414,399 B2 | 8/2016 | Eyuboglu et al. |
| 9,712,343 B2 | 7/2017 | Dussmann et al. |
| 9,794,791 B2 | 10/2017 | Hasarchi et al. |
| 9,867,052 B2 | 1/2018 | Sabat, Jr. et al. |
| 9,883,410 B2 | 1/2018 | Chen et al. |
| 9,917,622 B2 | 3/2018 | Lange |
| 9,936,470 B2 | 4/2018 | Eyuboglu et al. |
| 9,998,310 B2 | 6/2018 | Barbieri et al. |
| 10,015,685 B2 | 7/2018 | Chen et al. |
| 10,019,391 B2 | 7/2018 | Accapadi et al. |
| 10,050,711 B2 | 8/2018 | Testa et al. |
| 10,057,916 B2 | 8/2018 | Barabell et al. |
| 10,097,391 B2 | 10/2018 | Fertonani et al. |
| 10,231,256 B2 | 3/2019 | Checko |
| 10,244,507 B2 | 3/2019 | Tarlazzi et al. |
| 10,313,917 B2 | 6/2019 | Halabian et al. |
| 10,333,644 B2 | 6/2019 | Cavaliere et al. |
| 10,355,895 B2 | 7/2019 | Barbieri et al. |
| 10,499,388 B2 | 12/2019 | Tarlazzi |
| 10,638,266 B2 | 4/2020 | Huang et al. |
| 10,805,831 B1 | 10/2020 | Sung et al. |
| 10,886,976 B2 | 1/2021 | Rajagopal et al. |
| 10,925,116 B2 | 2/2021 | Zhang et al. |
| 11,096,075 B2 | 8/2021 | Notargiacomo et al. |
| 11,159,982 B2 | 10/2021 | Rajagopal |
| 11,490,272 B2 | 11/2022 | Mishra et al. |
| 2012/0113972 A1 | 5/2012 | Liu et al. |
| 2013/0128810 A1 | 5/2013 | Lee et al. |
| 2013/0279316 A1 | 10/2013 | Ahmadi |
| 2013/0279452 A1 | 10/2013 | Liu |
| 2013/0324076 A1 | 12/2013 | Harrang |
| 2014/0161447 A1 | 6/2014 | Graves et al. |
| 2014/0241224 A1 | 8/2014 | Fischer et al. |
| 2015/0229372 A1 | 8/2015 | Perlman et al. |
| 2015/0303950 A1 | 10/2015 | Shattil |
| 2015/0381217 A1 | 12/2015 | Kim et al. |
| 2016/0037550 A1 | 2/2016 | Barabell et al. |
| 2016/0308641 A1 | 10/2016 | Zeng et al. |
| 2016/0316463 A1 | 10/2016 | Liu et al. |
| 2017/0135099 A1 | 5/2017 | Song et al. |
| 2017/0164215 A1* | 6/2017 | Chen ............ H04W 24/02 |
| 2017/0164336 A1 | 6/2017 | Boldi et al. |
| 2017/0250927 A1 | 8/2017 | Stapleton et al. |
| 2017/0373890 A1 | 12/2017 | Fertonani et al. |
| 2018/0063847 A1 | 3/2018 | Huang et al. |
| 2018/0159611 A1 | 6/2018 | Majmundar et al. |
| 2018/0167993 A1 | 6/2018 | Thakkar et al. |
| 2018/0176898 A1 | 6/2018 | Yu et al. |
| 2018/0227028 A1 | 8/2018 | Lee |
| 2018/0234875 A1 | 8/2018 | Leroudier |
| 2018/0242349 A1 | 8/2018 | Noh et al. |
| 2018/0248797 A1 | 8/2018 | Kim et al. |
| 2018/0270692 A1 | 9/2018 | Yoon |
| 2018/0287696 A1* | 10/2018 | Barbieri ............ H04W 36/08 |
| 2018/0323832 A1 | 11/2018 | Uyehara et al. |
| 2018/0368205 A1 | 12/2018 | Park et al. |
| 2018/0376489 A1 | 12/2018 | Andrews et al. |
| 2019/0007246 A1 | 1/2019 | Fertonani et al. |
| 2019/0053400 A1 | 2/2019 | Hendrix et al. |
| 2019/0098643 A1 | 3/2019 | Kronestedt et al. |
| 2019/0104458 A1 | 4/2019 | Svennebring et al. |
| 2019/0116568 A1 | 4/2019 | Fertonani et al. |
| 2019/0208575 A1 | 7/2019 | Barbieri et al. |
| 2019/0245740 A1 | 8/2019 | Kachhla |
| 2019/0341970 A1* | 11/2019 | Lange ............ H04B 7/04 |
| 2019/0341985 A1 | 11/2019 | Chopra et al. |
| 2019/0342798 A1 | 11/2019 | Raghothaman et al. |
| 2019/0357196 A1 | 11/2019 | Majmundar et al. |
| 2019/0364492 A1 | 11/2019 | Azizi et al. |
| 2020/0028561 A1 | 1/2020 | Leulescu et al. |
| 2020/0077304 A1 | 3/2020 | Sandberg |
| 2020/0077355 A1 | 3/2020 | Sandberg |
| 2020/0092154 A1 | 3/2020 | Kwon et al. |
| 2020/0092229 A1 | 3/2020 | Levi et al. |
| 2020/0137549 A1 | 4/2020 | Barabell et al. |
| 2020/0204252 A1 | 6/2020 | Barbieri et al. |
| 2020/0287785 A1 | 9/2020 | Barabell |
| 2021/0014765 A1 | 1/2021 | Shan et al. |
| 2021/0045193 A1 | 2/2021 | Mishra et al. |
| 2021/0219197 A1 | 7/2021 | Prasad et al. |
| 2021/0243617 A1 | 8/2021 | Cooper et al. |
| 2023/0156452 A1 | 5/2023 | Barabell et al. |

FOREIGN PATENT DOCUMENTS

| | | |
|---|---|---|
| EP | 3269118 A2 | 1/2018 |
| JP | 2012527796 A | 11/2012 |
| WO | 2010139112 A1 | 12/2010 |
| WO | 2014018864 A1 | 1/2014 |
| WO | 2016145371 A2 | 9/2016 |
| WO | 2016201632 A1 | 12/2016 |
| WO | WO-2016201632 A1 * | 12/2016 |
| WO | 2017070635 A1 | 4/2017 |
| WO | 2017174111 A1 | 10/2017 |
| WO | 2018017468 A1 | 1/2018 |
| WO | 2018030508 A1 | 2/2018 |
| WO | 2020047126 A1 | 3/2020 |
| WO | 2020051146 A1 | 3/2020 |
| WO | 2020056183 A1 | 3/2020 |

OTHER PUBLICATIONS

U.S. Patent and Trademark Office, "Office Action", U.S. Appl. No. 16/810,424, dated Mar. 1, 2022, pp. 1 through 4, Published: US.
International Searching Authority, "International Search Report and Written Opinion from PCT Application No. PCT/US2021/039614", from Foreign Counterpart to U.S. Appl. No. 17/362,344, dated Oct. 13, 2021, pp. 1 through 9, Published: WO.
U.S. Patent and Trademark Office, "Notice of Allowance", U.S. Appl. No. 16/663,257, dated Nov. 5, 2021, pp. 1 through 8, Published: US.
European Patent Office, "Extended European Search Report from EP Application No. 19875389.9", from Foreign Counterpart to U.S. Appl. No. 16/663,257, dated May 9, 2022, pp. 1 through 29, Published: EP.
U.S. Patent and Trademark Office, "Notice of Allowance", U.S. Appl. No. 16/663,257, dated Jun. 2, 2022, pp. 1 through 10, Published: US.
U.S. Patent and Trademark Office, "Notice of Allowance", U.S. Appl. No. 16/810,424, dated Jul. 22, 2022, pp. 1 through 8, Published: US.

(56) References Cited

OTHER PUBLICATIONS

U.S. Patent and Trademark Office, "Final Office Action", U.S. Appl. No. 16/663,257, dated Aug. 23, 2021, pp. 1 through 9, Published: US.
U.S. Patent and Trademark Office, "Office Action", U.S. Appl. No. 16/810,424, dated Sep. 2, 2021, pp. 1 through 21, Published: US.
U.S. Patent and Trademark Office, "Notice of Allowance", U.S. Appl. No. 16/810,424, dated Mar. 5, 2020, pp. 1 through 12, Published: US.
Haberland et al., "Base Stations in the Cloud", Alcatel Lucent, Sep. 28, 2012, pp. 1-23.
International Bureau, "International Preliminary Report on Patentability from PCT Application No. PCT/US2019/057952", from Foreign Counterpart to U.S. Appl. No. 16/663,257, dated May 6, 2021, pp. 1 through 8, Published: WO.
International Searching Authority, "International Search Report and Written Opinion from PCT Application No. PCT/US2019/057952", from Foreign Counterpart to U.S. Appl. No. 16/663,257, dated Feb. 27, 2020, pp. 1-11, Published: WO.
International Searching Authority, "International Search Report and Written Opinion from PCT Application No. PCT/US2020/021196", from Foreign Counterpart to U.S. Appl. No. 16/810,424, dated Jul. 2, 2020, pp. 1 through 11, Published: WO.
U.S. Patent and Trademark Office, "Office Action", U.S. Appl. No. 16/663,257, dated Feb. 26, 2021, pp. 1 through 18, Published: US.
Zhu et al., "Virtual Base Station Pool: Towards A Wireless Network Cloud for Radio Access Networks", CF'10, May 2010, pp. 1-10, ACM.
European Patent Office, "Extended European Search Report" from EP Application No. 20765671.1 mailed on Nov. 7, 2022, from Foreign Counterpart to U.S. Appl. No. 16/810,424, Pages 1 through 13, Published in EP.
Interdigital Communications, "Fronthauling with New Radio Technology" 3GPP R2-162826, 3GPP TSG-RAN WG2 #93bis, Apr. 11, 2016; pp. 1-7; Published in Croatia.
U.S. Patent and Trademark Office, "Notice of Allowance", U.S. Appl. No. 16/663,257, filed Sep. 13, 2022, pp. 1-13, Published: US.
3GPP TSG RAN WG3 #91 bis, R3-160804, "The function split between CU and DU", Bangalore, India, Apr. 11-15, 2016, pp. 1-7.
State Intellectual Property Office, P.R. China, "Notice to Grant", from CN Application No. 201980070026.4, May 24, 2023, from Foreign Counterpart to U.S. Appl. No. 16/663,257. pp. 1-6, Published: CN.
Nakao et al., "TR: Application of networl softwarization to IMT-2020", International Telecommunications Union, Telecommunications Standardization Sector, Study Period 2017-2020, TD 69 (GEN/13), Study Group 13, Feb. 6-17, 2017, pp. 1-147.
European Patent Office, "Extended European Search Report", dated May 31, 2024, from EP Application No. 21831858.2, from Foreign Counterpart to U.S. Appl. No. 17/362,344, pp. 1-9, Published: EP.

\* cited by examiner

OPEN RADIO ACCESS NETWORK WITH UNIFIED REMOTE UNITS SUPPORTING MULTIPLE FUNCTIONAL SPLITS, MULTIPLE WIRELESS INTERFACE PROTOCOLS, MULTIPLE GENERATIONS OF RADIO ACCESS TECHNOLOGY, AND MULTIPLE RADIO FREQUENCY BANDS

CROSS-REFERENCE TO RELATED APPLICATIONS

This application claims the benefit of Indian Provisional Patent Application Serial No. 202041027733 filed on Jun. 30, 2020, entitled "OPEN RADIO ACCESS NETWORK WITH UNIFIED REMOTE UNITS SUPPORTING MULTIPLE FUNCTIONAL SPLITS, MULTIPLE WIRELESS INTERFACE PROTOCOLS, MULTIPLE GENERATIONS OF RADIO ACCESS TECHNOLOGY, AND MULTIPLE RADIO FREQUENCY BANDS"; and U.S. Provisional Patent Application Ser. No. 63/064,557 filed on Aug. 12, 2020, entitled "OPEN RADIO ACCESS NETWORK WITH UNIFIED REMOTE UNITS SUPPORTING MULTIPLE FUNCTIONAL SPLITS, MULTIPLE WIRELESS INTERFACE PROTOCOLS, MULTIPLE GENERATIONS OF RADIO ACCESS TECHNOLOGY, AND MULTIPLE RADIO FREQUENCY BANDS", the entirety of both of which are incorporated herein by reference.

BACKGROUND

The Fifth Generation (5G) radio access network (RAN) architecture allows for a range of deployment options, supporting a range of 5G wireless services. The 5G RAN architecture supports multiple options as to how the RAN functions are split between the centralized entities and the distributed entities. This is also referred to as the "functional split" used in the RAN.

The Third Generation Partnership Project (3GPP) has defined eight general functional split options for fronthaul networks. In the context of these 3GPP definitions, the functional split occurs between a baseband unit (BBU) (or other centralized entity) and a remote radio head (RRH) (or other distributed entity), where data is communicated over the fronthaul network between the BBU and RRH. The nature and format of the data is dependent on where the functional split occurs. Unless expressly indicated otherwise, references to the "Layers" of the Open System Interconnection (OSI) model are relative to the layers used for wirelessly communicating with user equipment (UE) using the associated wireless interface.

The eight general functional split options are shown in FIG. 1. In FIG. 1, the functions shown to the left of the associated functional split option are implemented by the BBU and the functions shown to the right of the associated functional split option are implemented by the RRH. As shown in FIG. 1, the first functional split option shown in FIG. 1 ("Option 1") is implemented between Layer 3 102 and Layer 2 104. That is, with Option 1, the BBU implements all of the Layer 3 functions for both the downlink and uplink (including the control-plane Radio Resource Control (RRC) functions 106 and the user-plane data functions 108 that send and receive data packets (such as Internet Protocol (IP) and User Datagram Protocol (UDP) packets)). With Option 1, the RRH implements all of the functions of Layer 2 104 for both the downlink and uplink (including the packet data convergence protocol (PDCP) functions 110, the high and low radio link control (RLC) functions 112 and 114, and the high and low media access control (MAC) functions 116 and 118) and all of the functions for Layer 1 120 for both the downlink and uplink (including the high and low physical layer (PHY) functions 122 and 124) as well as the radio frequency (RF) functions 126.

As shown in FIG. 1, the second functional split option shown in FIG. 1 ("Option 2") is implemented between the PDCP functions 110 and the high RLC functions 112. That is, with Option 2, the BBU implements, for both the downlink and uplink, all of the functions of Layer 3 102 as well as the PDCP functions 110 of Layer 2 104. With Option 2, the RRH implements the other functions of Layer 2 104 for both the downlink and uplink (including the high and low RLC functions 112 and 114 and the high and low MAC functions 116 and 118) and all of the functions of Layer 1 120 and the RF functions 126 for both the downlink and uplink. As shown in FIG. 1, the third functional split option shown in FIG. 1 ("Option 3") is implemented between the high RLC functions 112 and the low RLC functions 114 of Layer 2 104. That is, with Option 3, the BBU implements, for both the downlink and uplink, all of the functions of Layer 3 102 as well as the PDCP functions 110 and the high RLC functions 112 of Layer 2 104. With Option 3, the RRH implements the other functions of Layer 2 104 for both the downlink and uplink (including the low RLC functions 114 and the high and low MAC functions 116 and 118) and all of the functions of Layer 1 120 and the RF functions 126 for both the downlink and uplink.

As shown in FIG. 1, the fourth functional split option shown in FIG. 1 ("Option 4") is implemented between the low RLC functions 114 and the high MAC functions 116 of Layer 2 104. That is, with Option 4, the BBU implements, for both the downlink and uplink, all of the functions of Layer 3 102 as well as the PDCP functions 110 and the high and low RLC functions 112 and 114 of Layer 2 104. With Option 4, the RRH implements the other functions of Layer 2 104 for both the downlink and uplink (including the high and low MAC functions 116 and 118) and all of the functions of Layer 1 120 and the RF functions 126 for both the downlink and uplink. As shown in FIG. 1, the fifth functional split option shown in FIG. 1 ("Option 5") is implemented between the high and low MAC functions 116 and 118 of Layer 2 104. That is, with Option 5, the BBU implements, for both the downlink and uplink, all of the functions of Layer 3 102 as well as the PDCP functions 110, the high and low RLC functions 112 and 114, and the high MAC functions 116 of Layer 2 102. With Option 5, the RRH implements the other functions of Layer 2 104 for both the downlink and uplink (including the low MAC functions 118) and all of the functions of Layer 1 120 and the RF functions 126 for both the downlink and uplink.

As shown in FIG. 1, the sixth functional split option shown in FIG. 1 ("Option 6") is implemented between Layer 2 106 and Layer 1 120. That is, with Option 6, the BBU implements, for both the downlink and uplink, all of the functions of Layer 3 102 and Layer 2 104. With Option 6, the RRH implements all of the functions of Layer 1 120 and the RF functions 126 for both the downlink and uplink. As shown in FIG. 1, the seventh functional split option shown in FIG. 1 ("Option 7") is implemented between the high PHY functions 122 and the low PHY functions 124 of Layer 1 120. That is, with Option 7, the BBU implements, for both the downlink and uplink, all of the functions of Layer 3 102 and Layer 2 104 as well as the high PHY functions 122 of Layer 1 120. With Option 7, the RRH implements the other functions of Layer 1 120 for both the downlink and uplink (including the low PHY functions 124) as well as the RF functions 126 for both the downlink and uplink. There are various variants of the Option 7 functional split (referred to as "Option 7.1", "Option 7.2", and "Option 7.3").

As shown in FIG. 1, the eighth functional split option shown in FIG. 1 ("Option 8") is implemented between the Layer 1 120 and the RF functions 126. That is, with Option 8, the BBU implements, for both the downlink and uplink, all of the functions of Layer 3 102, Layer 2 104, and Layer 1 120. With Option 8, the RRH implements the RF functions 126 for both the downlink and uplink.

There are different trade-offs associated with the various functional splits. For example, if the fronthaul network is implemented using a switched Ethernet network and Option 2 functional split is used, some Layer 2 Ethernet functions can be implemented in the RRH and aggregation and statistical multiplexing of the user-plane data packets can be done before the downlink and uplink data is communicated over the fronthaul network. This can greatly reduce the amount of data communicated over the fronthaul network. In contrast, if an Option 7 functional split is used, more data will be communicated over the fronthaul network, but the high PHY functions 122 (implemented in the BBU) can be pooled and implemented using centralized processing resources that can, for example, support sharing processing resources across many cells to promote more efficient processing resource usage.

FIG. 2 is a block diagram showing different RAN architectures. These RAN architectures can be used for both 4G and 5G, across multiple radio access technologies (RAT), and are band agnostic (that is, can be used with multiple different frequency bands ranging from sub-6 GigaHertz (GHz) to millimeter (mmWave) frequency bands).

FIG. 2 shows three variations of a distributed radio access network (DRAN) architecture that can be used to implement 4G and 5G RANs. In the upper DRAN architecture 202, both the BBU and RRH for a given cell are deployed at the tower, with a backhaul connection to the core network (a gateway, controller, or access node for which can be deployed at a centralized unit). In the middle and lower DRAN architectures 204 and 206, the BBU is deployed at a distribution unit near the tower, with a fronthaul connection between the BBU and the RRH at the tower and a backhaul connection between the BBU and the core network. In the middle DRAN architecture 204 shown in FIG. 2, the Option 2 functional split is used between the BBU and RRH. In the lower DRAN architecture 206 shown in FIG. 2, the Option 7 functional split is used between the BBU and RRH.

FIG. 2 shows two variations of a centralized radio access network (CRAN) architecture that can be used to implement 4G and 5G RANs. In the upper CRAN architecture 208, the functions of the BBU are partially centralized, with some BBU functions deployed at the central unit and the other BBU functions deployed at the distributed unit, with a fronthaul connection coupling the central unit and the distributed unit. In this architecture 208, the Option 2 functional split is used between the central unit and the distributed unit, with the Layer 3 functions deployed at the central unit (along with a gateway, controller, or access node for the core network) and all of the Layer 2 functions (along with the high PHY functions of Layer 1) deployed at the distributed unit. The RRH functions are deployed at the tower site, with a fronthaul connection coupling the distributed unit and the tower site. In this architecture 208, the Option 7 functional split is used between the distributed unit and tower site, with the low PHY functions of Layer 1 and the RF functions deployed at the tower site.

In the lower CRAN architecture 210, the functions of the BBU are fully centralized, with all of the BBU functions deployed at the central unit and the RRH functions deployed at the tower site, with a fronthaul connection coupling the central unit and the tower site. In this architecture 210, the Option 7 functional split is used between the central unit and the tower site, with all of the Layer 3 and Layer 2 functions deployed at the central unit (along with the high PHY functions of Layer 1 and the access nodes for the core network) and with the low PHY functions of Layer 1 and the RF functions deployed at the tower site.

The amount of data transported between the BBU and RRH (and, therefore, the required fronthaul bandwidth) depends on the particular functional split option used. FIG. 3 illustrates the various fronthaul capacity requirements for various functional split options for a massive multiple-input-multiple-output (MIMO) configuration using 100 MegaHertz (MHz) system bandwidth and 64 transmit streams and 64 receive streams.

As shown in FIG. 3, 3 gigaBits per second (Gbps) of fronthaul bandwidth is required if Option 6 is used for the functional split. If one of the variants of the Option 7 functional split is used, the required fronthaul bandwidth varies between about 10 Gbps and 140 Gbps. (It is noted that the Option 7.2 and 7.3 functional splits seem more realistic as those functional splits deploy the massive MIMO beamforming at the RRH.) If the Option 8 functional split is used (with all of the PHY functions deployed at the BBU), the required fronthaul bandwidth is 236 Gbps.

Organizations (such as the xRAN Forum and the O-RAN alliance) are working on new fronthaul specifications based on the Option 7.2 functional split. One key aspect of the Option 7.2 functional split is that the IQ samples communicated over the fronthaul are frequency domain IQ samples as opposed to time domain IQ samples (as is the case with the traditional Option 8 functional split). In addition, these fronthaul specifications are expected to support the use of switched Ethernet networks for the fronthaul connections.

Some RANs also include distributed antenna systems (DASs) to improve the wireless radio frequency (RF) coverage provided by one or more base stations. Historically, DASs have interfaced with the base stations using analog RF signals. The new RAN architectures described above can be used with such DASs by interfacing an RRH or RU to the DAS using analog RF signals. Some existing DASs have the ability to interface directly with a BBU using a legacy Option 8 digital interface (such as the Common Public Radio Interface ("CPRI") digital interface or the Open Base Station Standard Initiative ("OBSAI") digital interface). However, such systems either generate an analog RF signal within the DAS (which is then processed as any other analog RF signal would be) or convert the digital IQ samples to a format that is otherwise used for digitally transporting signals within the nodes of the DAS. However, such existing DASs are able to directly interface with a BBU only using an Option 8 functional split, which, as noted above, requires significant fronthaul bandwidth.

SUMMARY

One embodiment is directed to an open radio access network to provide wireless coverage for a plurality of cells at a site. The open radio access network comprises a virtualized headend comprising one or more base-station nodes. The open radio access network further comprises a plurality of unified remote units deployed at the site, each of which is associated with one or more antennas to wirelessly transmit and receive downlink and uplink radio frequency (RF) signals to and from user equipment. The plurality of unified remote units is configured to communicate with the one or more base-station nodes using a switched Ethernet network. Each unified remote unit comprises multiple downlink processing signal paths, multiple uplink processing signal paths, multiple downlink radio signal paths, and multiple uplink radio signal paths configured to support multiple fronthaul splits, multiple wireless interface protocols, multiple generations of radio access technology, and multiple frequency bands.

Another embodiment is directed to a unified remote unit for use in an open radio access network to provide wireless coverage for a plurality of cells at a site. The open radio access network comprises a virtualized headend comprising one or more base-station nodes. The unified remote unit comprises multiple downlink processing signal paths, multiple uplink processing signal paths, multiple downlink radio signal paths, and multiple uplink radio signal paths. The unified remote unit is configured to communicate with the one or more base-station nodes using a switched Ethernet network. The multiple downlink processing signal paths, the multiple uplink processing signal paths, the multiple downlink radio signal paths, and the multiple uplink radio signal paths are configured to support multiple front haul splits to communicate user-plane and control-plane transport data to and from base-station nodes and to support multiple wireless interface protocols, multiple generations of radio access technology, and frequency bands for wirelessly communicating with the user equipment.

Another embodiment is directed to a method of providing wireless coverage for a plurality of cells at a site using an open radio access network that comprises a virtualized headend comprising one or more base-station nodes and a plurality of unified remote units deployed at the site, each of which is associated with one or more antennas to wirelessly transmit and receive downlink and uplink radio frequency (RF) signals to and from user equipment. The method is performed for each of at least some cells served by the open radio access network using a respective functional split, a respective wireless interface protocol, and a respective frequency band. The method comprises, by a respective one or more base-station nodes serving that cell: performing processing, in accordance with the respective functional split, the respective wireless interface protocol, and the respective frequency band used for that cell, to generate respective digital downlink fronthaul data for that cell; and sending, over a switched Ethernet network, the respective digital downlink fronthaul data to the respective one or more of the unified remote units serving that cell. The method further comprises, by each of a respective one or more unified remote units serving that cell: receiving, from the switched Ethernet network, the respective digital downlink fronthaul data for that cell; performing processing, in accordance with the respective functional split, the respective wireless interface protocol, and the respective frequency band used for that cell, of the respective digital downlink fronthaul data for that cell to generate respective downlink analog RF signals for that cell; and wirelessly transmitting the respective downlink analog RF signals for that cell from antennas associated with that unified remote unit. The method further comprises, by each of the respective one or more unified remote units used to serve that cell: wirelessly receiving respective uplink analog RF signals for that cell via the antennas associated with that unified remote unit; performing processing, in accordance with the respective functional split, the respective wireless interface protocol, and the respective frequency band used for that cell, of the respective uplink analog RF signals to generate respective digital uplink fronthaul data for that cell; and sending, over the switched Ethernet network, the respective digital uplink fronthaul data for that cell to the one or more base-station nodes used to serve that cell. The method further comprises, by the respective one or more base-station nodes serving that cell: receiving, from the switched Ethernet network, the respective digital uplink fronthaul data for that cell; and performing processing, in accordance with the respective functional split, the respective wireless interface protocol, and the respective frequency band used for that cell, of the respective digital uplink fronthaul data for that cell.

Other embodiments are disclosed.

The details of various embodiments are set forth in the accompanying drawings and the description below. Other features and advantages will become apparent from the description, the drawings, and the claims.

DRAWINGS

Figure 1:
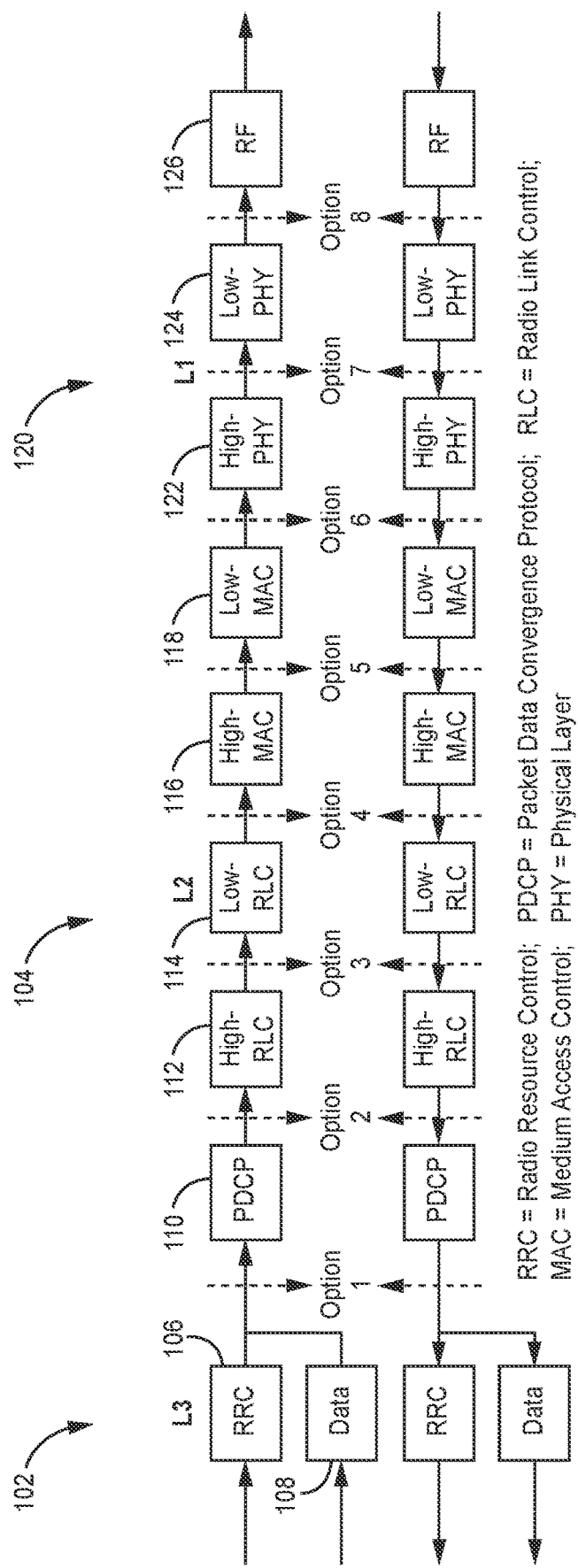
FIG. 1 is a block diagram illustrating eight general functional split options.
Figure 2:
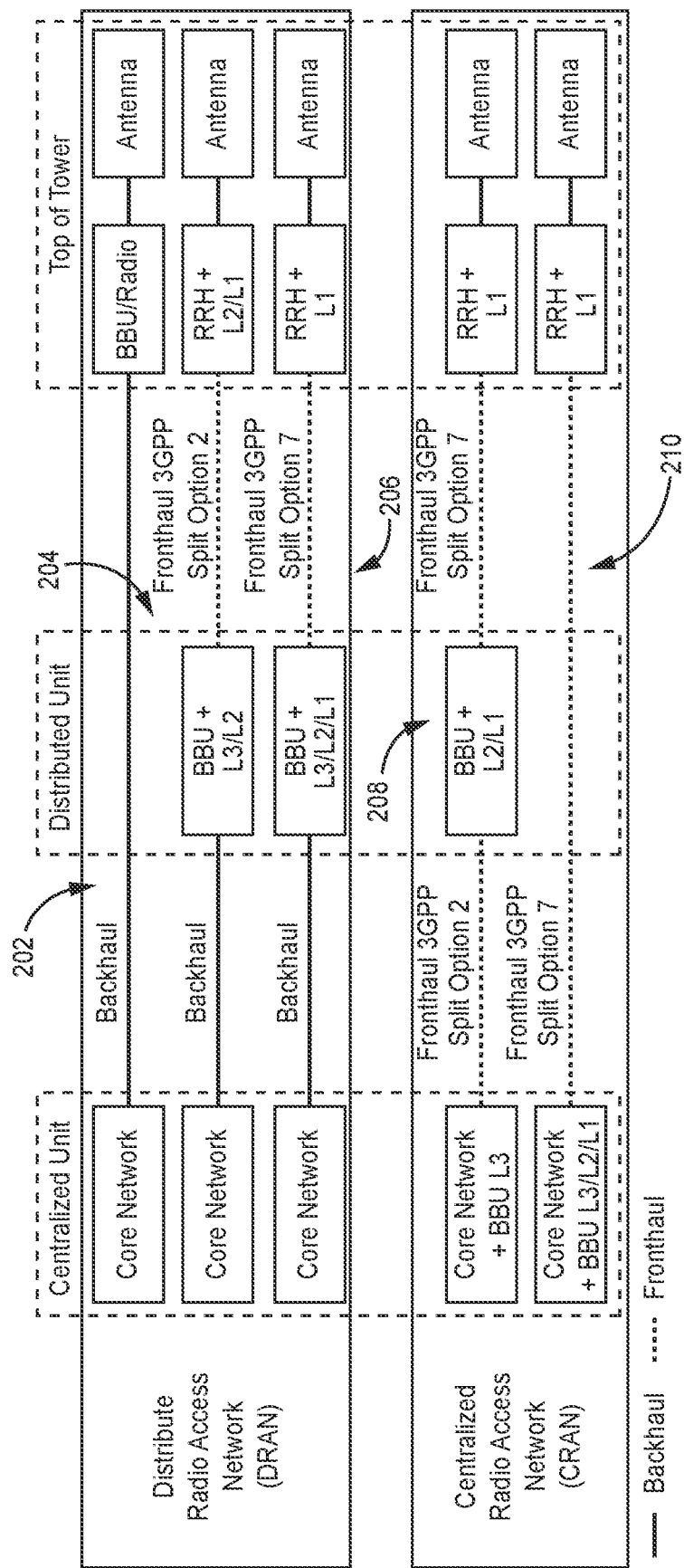
FIG. 2 shows two variations of a centralized radio access network (CRAN) architecture that can be used to implement 4G and 5G RANs.
Figure 3:
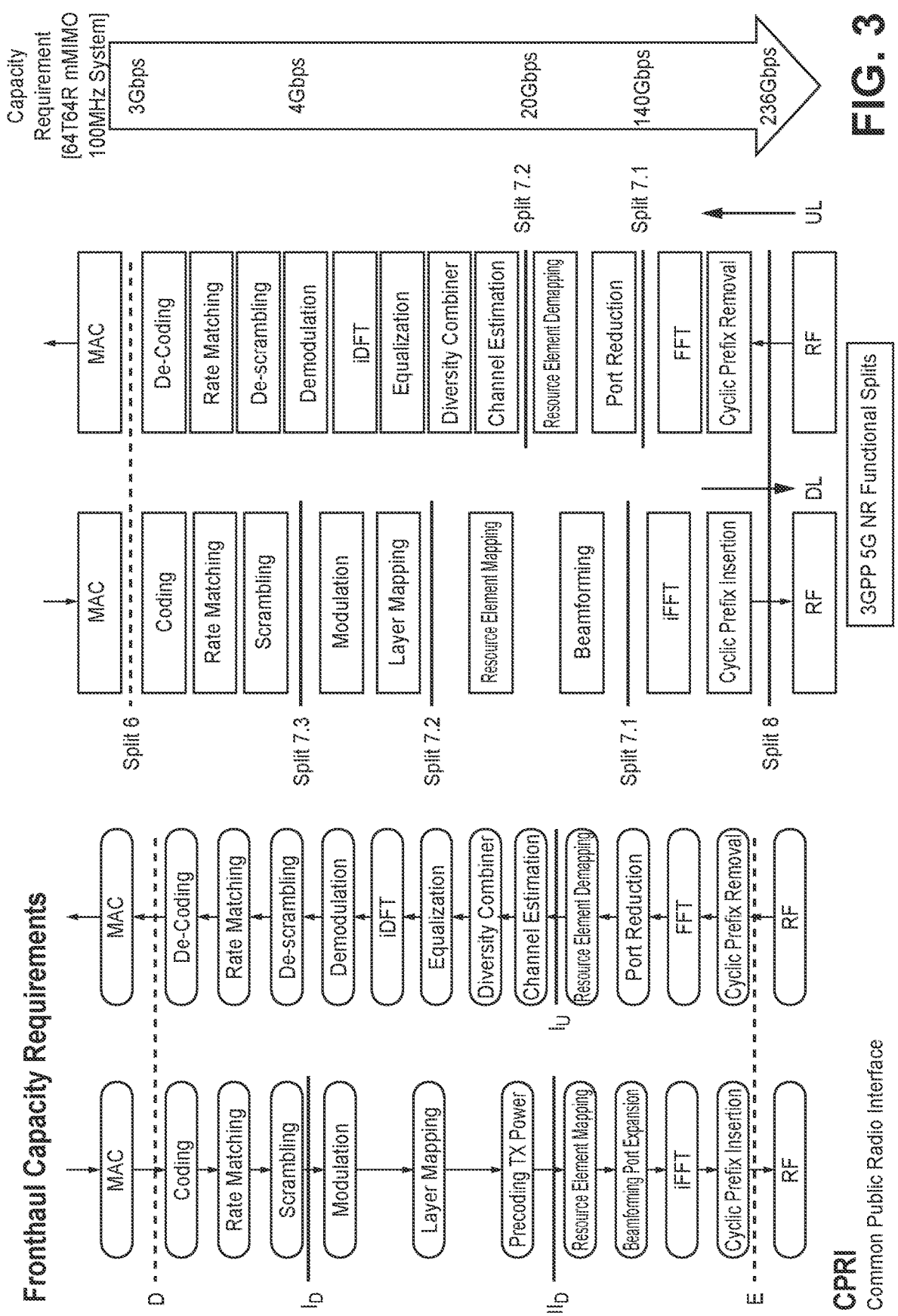

FIG. 3 illustrates the various fronthaul capacity requirements for various functional split options for a massive multiple-input-multiple-output (MIMO) configuration using 100 MegaHertz (MHz) system bandwidth and 64 transmit streams and 64 receive streams.

Figure 4:
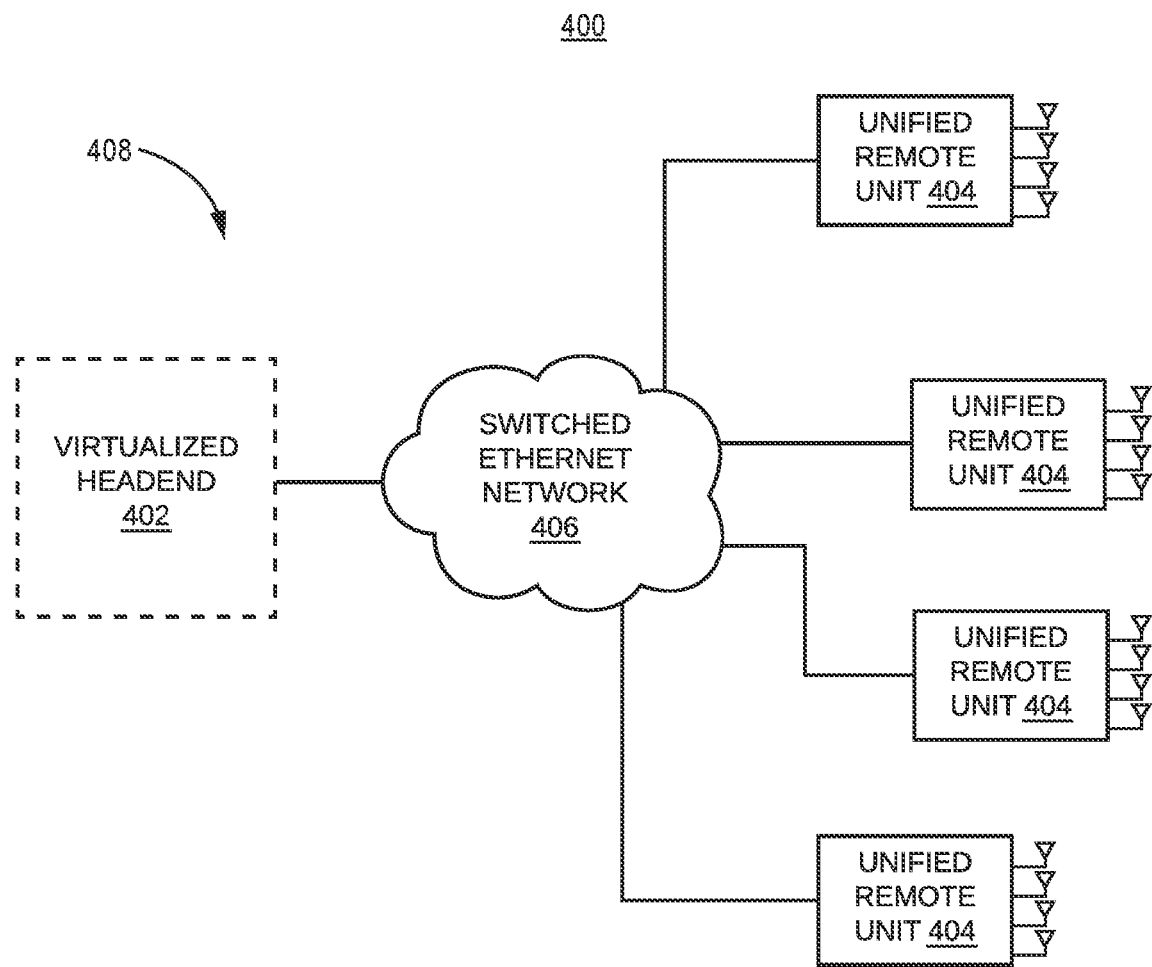

FIG. 4 illustrates one exemplary embodiment of an open radio access network that comprises DAS features.

Figure 5:
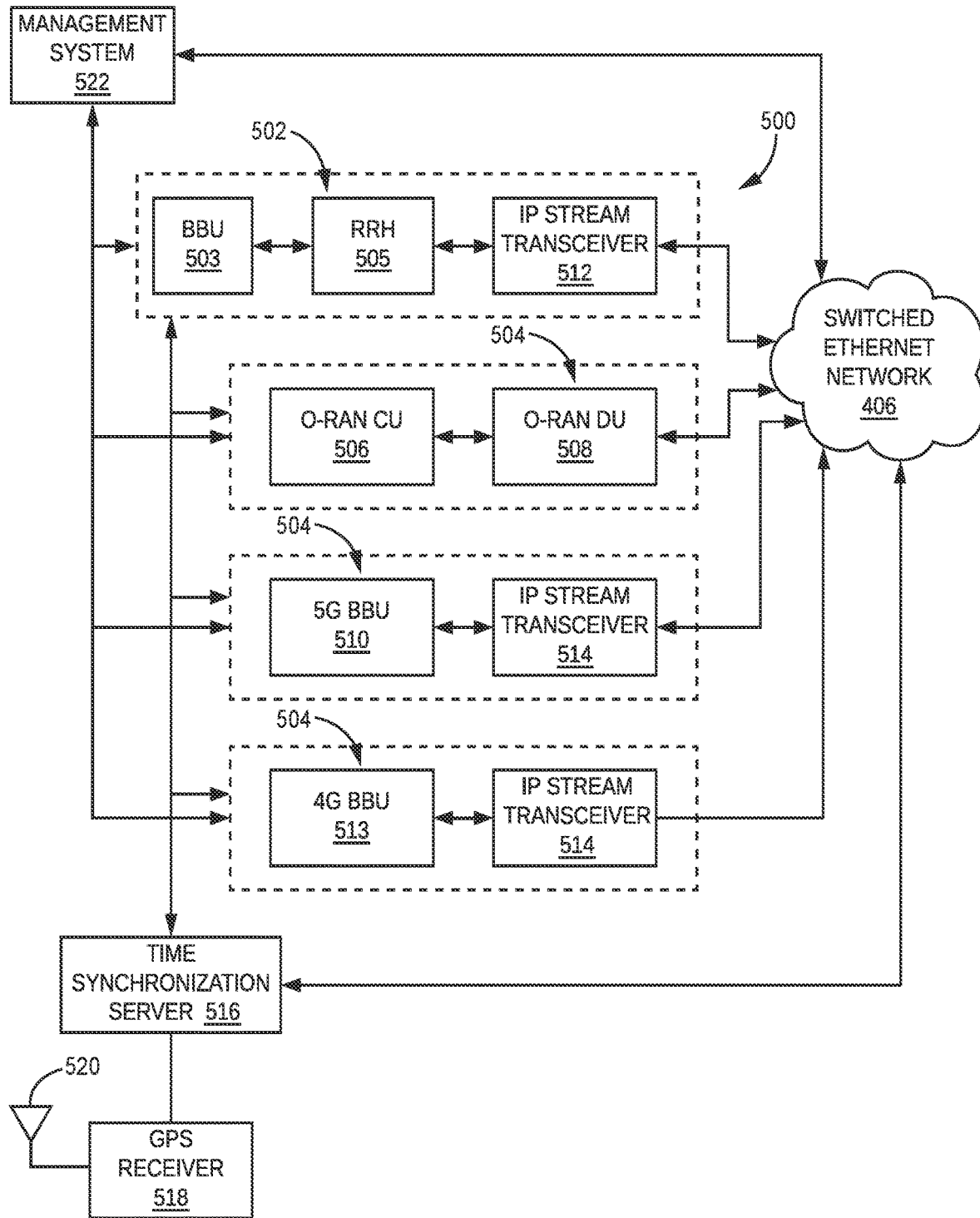

FIG. 5 illustrates one exemplary embodiment of a virtualized headend suitable for use in the open radio access network of FIG. 4.

Figure 6:
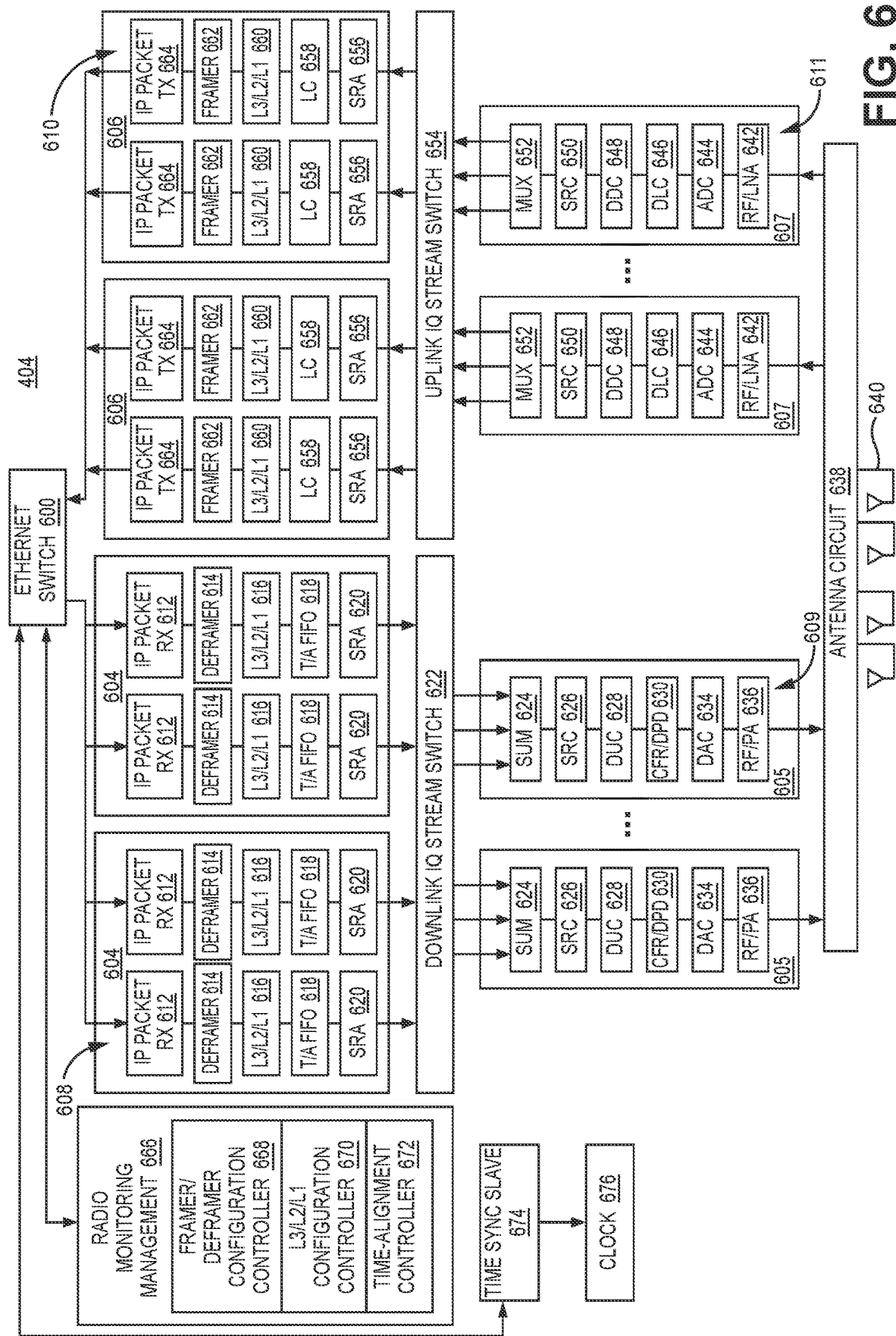

FIG. 6 illustrates one exemplary embodiment of a unified remote unit suitable for use in the open radio access network of FIG. 4.

Figure 7:
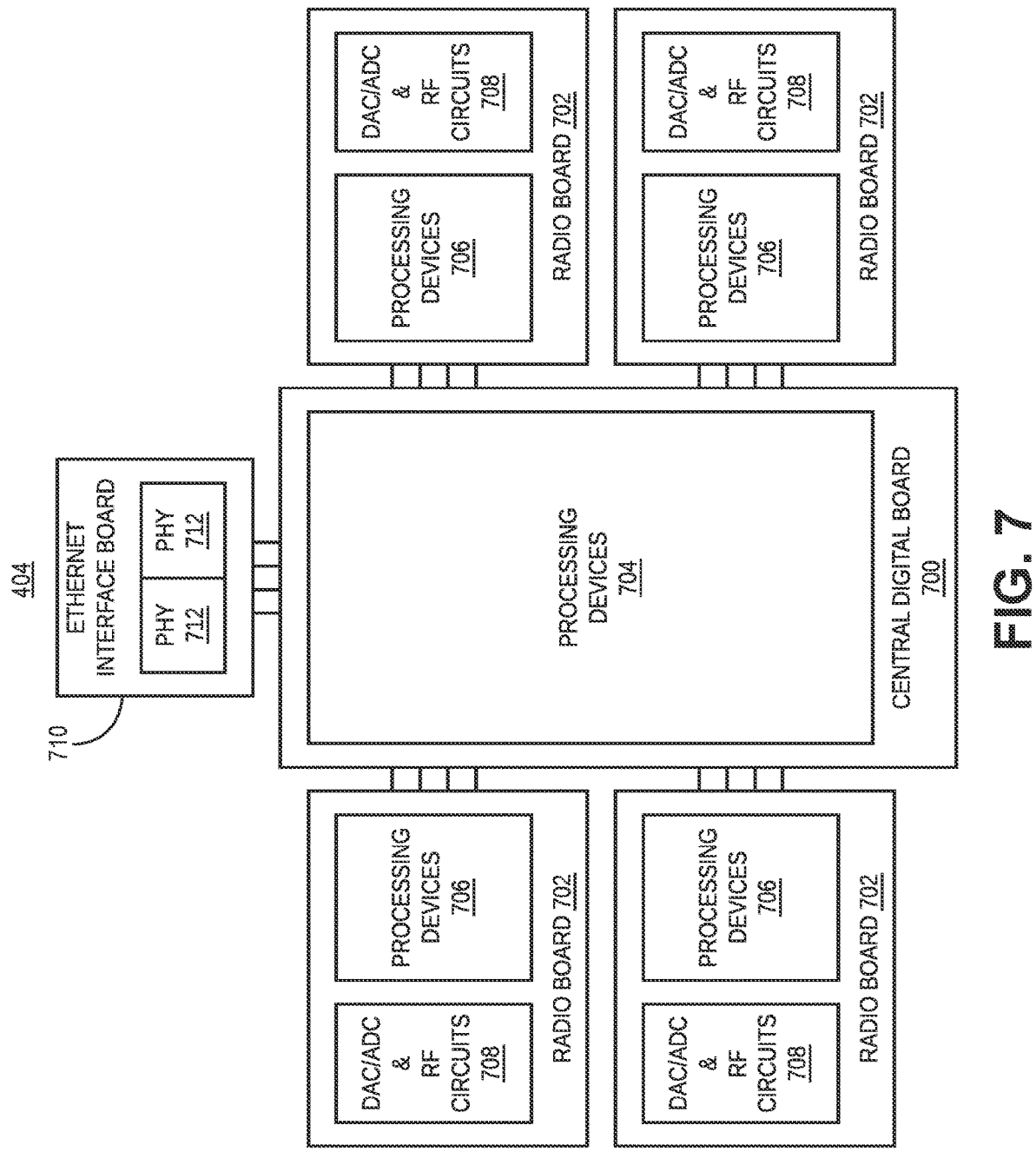

FIG. 7 illustrates one exemplary modular implementation of the unified remote unit shown in FIG. 6.

Figure 8:
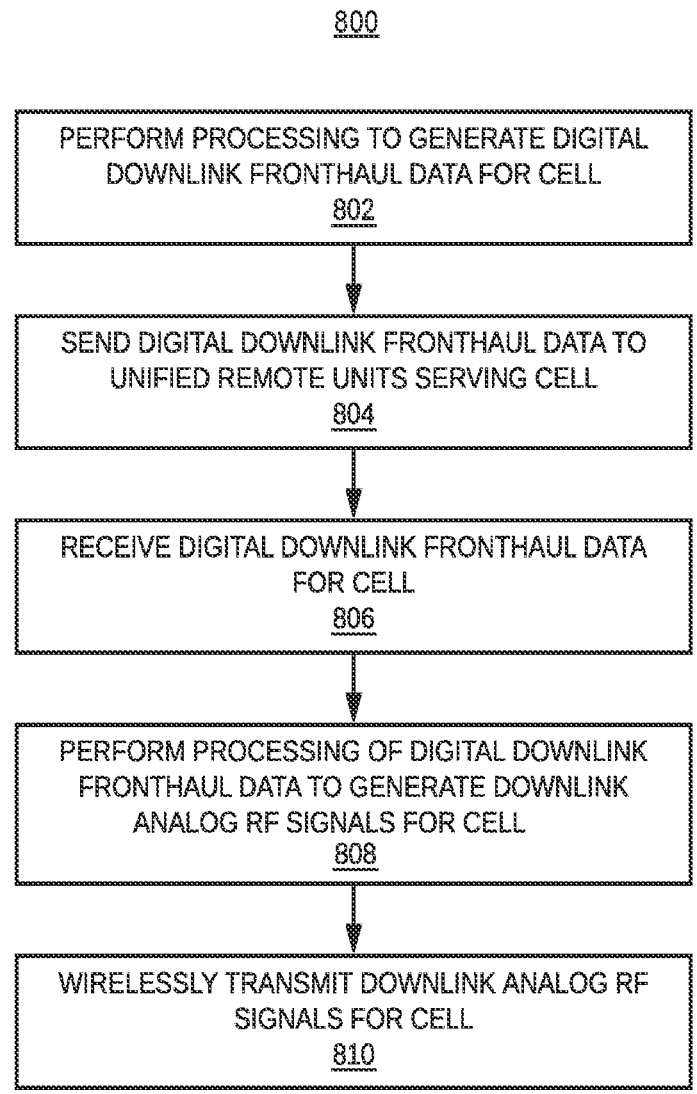

FIG. 8 comprises a high-level flowchart illustrating one exemplary embodiment of a method of transmitting downlink analog RF signals using the open radio access network.

Figure 9:
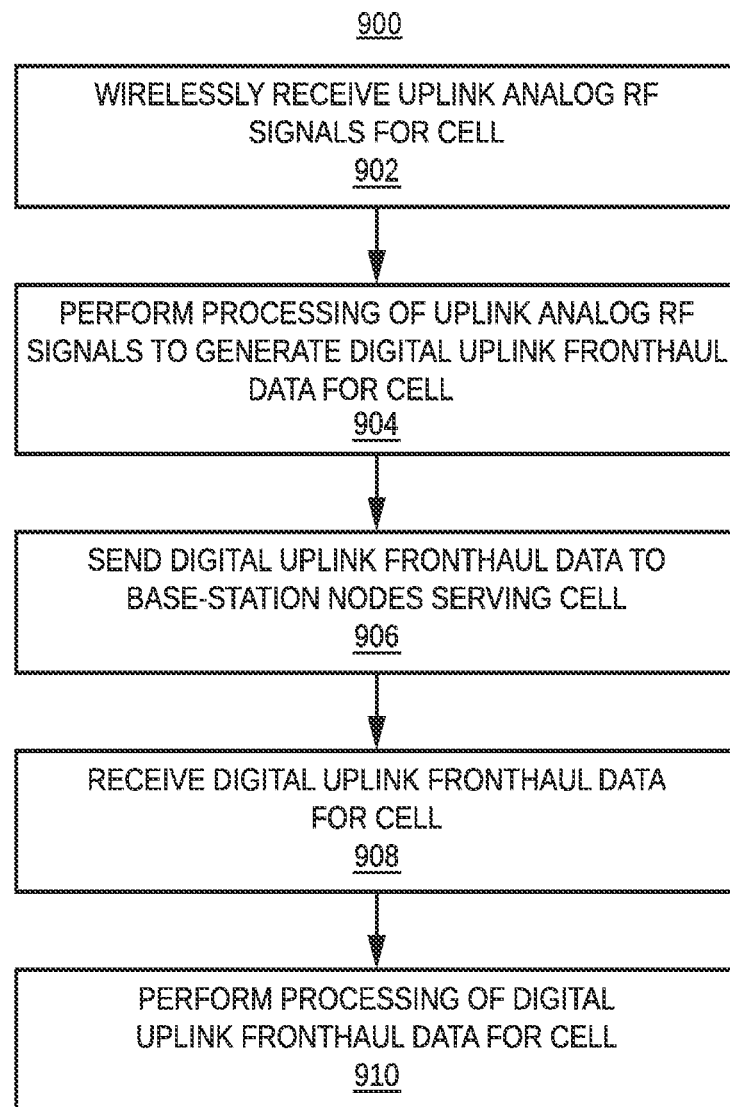

FIG. 9 comprises a high-level flowchart illustrating one exemplary embodiment of a method of receiving uplink analog RF signals using the open radio access network.

Figure 10:
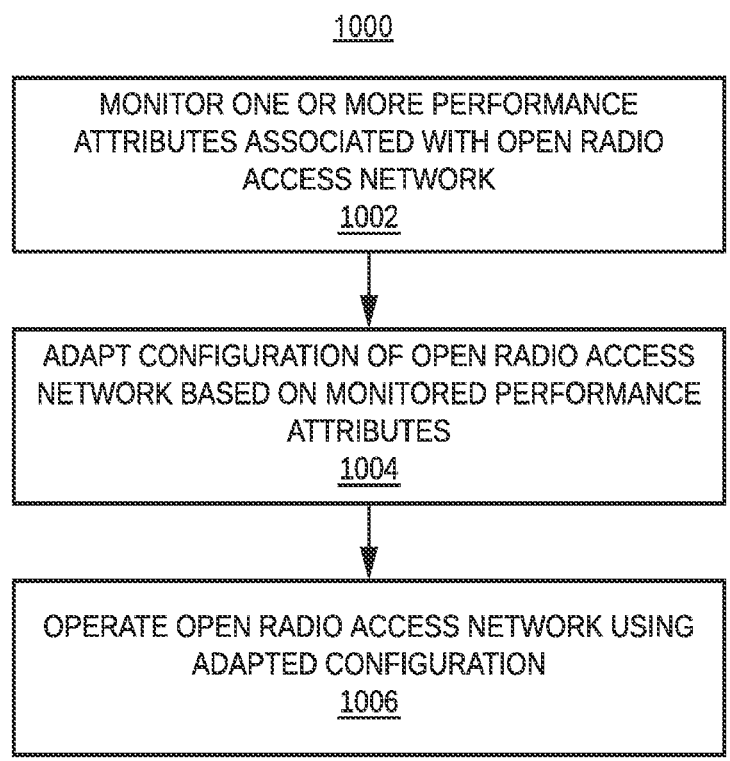

FIG. 10 comprises a high-level flowchart illustrating one exemplary embodiment of a method of adapting the operation of an open radio access network.

Figure 11:
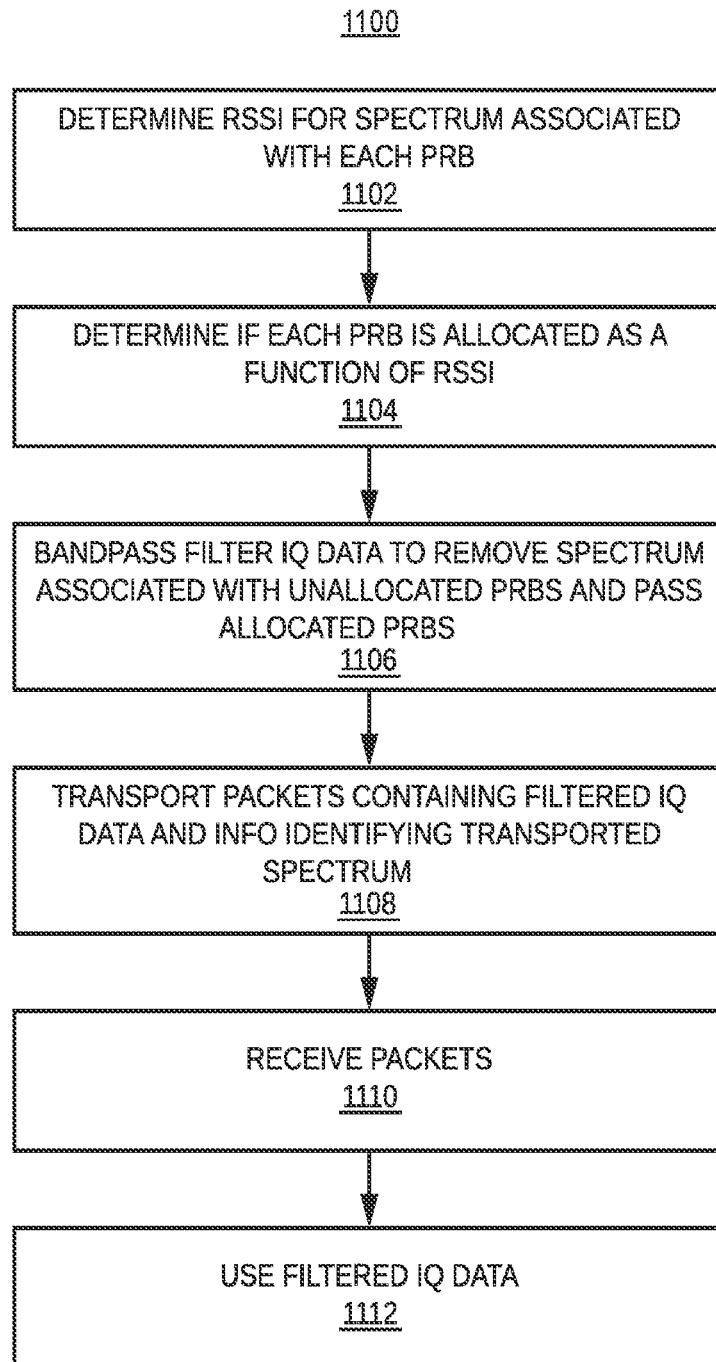

FIG. 11 comprises a high-level flowchart illustrating one exemplary embodiment of a method of optimizing transport of fronthaul data using an Option 8 functional split and time-domain IQ data.

Like reference numbers and designations in the various drawings indicate like elements.

DETAILED DESCRIPTION

FIG. 4 illustrates one exemplary embodiment of an open radio access network 400 that comprises DAS features.

As shown in FIG. 4, the open radio access network 400 shown in FIG. 4 comprises a virtualized headend 402 that is communicatively coupled to one or more unified remote units 404 via a switched Ethernet network 406. The unified remote units 404 are deployed throughout a site 408 in order to provide wireless coverage at the site 408.

The open radio access network 400 is configured to use four different types of communications, each of which is communicated in a separate logical plane. In this case, the four types of data are user data, control data, management data, and synchronization data, which are communicated in a user plane (also referred to here as the "U-plane"), control plane (also referred to here as the "C-plane"), management plane (also referred to here as the "M-plane"), and synchronization plane (also referred to here as the "S-plane"), respectively. The user data (also referred to here as "user plane data" or "U-plane data") comprises the underlying data intended to be transmitted to or by the end users. The control data (also referred to here as "control plane data" or "C-plane data") comprises data used in providing real-time control of the functions and entities used for communicating the user data. The management data (also referred to here as "management plane data" or "M-plane data") comprises data used in carrying out non-real-time control and management of the functions and entities used for communicating the user data. The synchronization data (also referred to here as "synchronization plane data" or "S-plane data") comprises data used in synchronizing the functions and entities used for communicating the user data.

FIG. 5 illustrates one exemplary embodiment of a virtualized headend 402 suitable for use in the open radio access network 400 of FIG. 4. In the embodiment shown in FIG. 5, the virtualized headend 402 comprises a plurality of heterogeneous base-station nodes 500. The virtualized headend 402 is "virtualized" in the sense that not all of the base-station nodes 500 are deployed locally at the site 408 where the wireless coverage is being provided and may be deployed remotely from that site 408.

For each cell served by the open radio access network 400, one or more base-station nodes 500 transmit and receive user-plane and control-plane data for that cell. Also, for each cell served by the open radio access network 400, the associated one or more base-station nodes 500 also communicate with nodes in a service provider's core network.

The base-station nodes 500 of the virtualized headend 402 are heterogeneous in that the one or more base station nodes 500 used to serve a first cell are configured to transmit and receive user-plane and control-plane data in a format that differs from the format in which the one or more base station nodes 500 used to serve a second cell are configured to transmit and receive user-plane and control-plane data. Also, the respective one or more base station nodes 500 used to serve different cells can be configured to support different RF bands and/or different wireless interface protocols.

As shown in FIG. 5, for at least one cell served by the open radio access network 400, the one or more base-station nodes 500 used to serve that cell include one or more base-station nodes 502 that are configured to interface with a DAS using an analog RF interface. This type of base station node is also referred to here as an "analog-RF-interface base station node" 502. Such an analog-RF-interface base station node 502 can be implemented, for example, using an RRH 505 that is deployed at the site 408, where the associated BBU 503 can be co-located with the RRH 505 at the site 408 or can be deployed remotely from that site 408. In such an example, the RRH 505 can be coupled to the BBU 503 using a suitable fronthaul interface (for example, using a legacy CPRI interface implemented over one or more fibers). Such an analog-RF-interface base station node 502 can be implemented in other ways (for example, using a single-node small cell base station (such as a femtocell) deployed at the site 408 where the corresponding BBU 503 and RRH 505 functions are enclosed within a common enclosure). Such analog-RF-interface base station nodes 502 can be implemented using legacy base station equipment that supports older wireless interface protocols (for example, older commercial cellular wireless interface protocols such as a Second Generation (2G), Third Generation (3G), or Fourth Generation (4G) wireless interface protocol and older trunked radio or other public safety wireless interface protocols such a Terrestrial Trunked Radio (TETRA) wireless interface protocol). Such analog-RF-interface base station nodes 502 can be implemented using new base station equipment that supports newer wireless interface protocols (such as a 5G wireless interface protocol). Examples of such new base station equipment include distributed base station equipment that uses proprietary fronthaul interfaces between the BBU 503 and RRH 505 functions or single-node base stations or access points that only have an external backhaul interface and external analog RF antenna interface. Such analog-RF-interface base station nodes 502 can be implemented in other ways.

As shown in FIG. 5, for at least one cell served by the open radio access network 400, the one or more base-station nodes 500 used to serve that cell can include one or more base station nodes 504 that are configured to interface with a DAS using a digital interface. These types of base station nodes are also referred to here as "digital-interface base station nodes" 504.

The digital-interface base station nodes 504 can be implemented using base station equipment typically used to provide 5G service. In one 5G example shown in FIG. 5, the digital-interface base station nodes 504 include a central unit (CU) 506 and/or a distributed unit (DU) 508 that complies with one or more specifications defined by the O-RAN Alliance. ("O-RAN" is an acronym for "Open RAN.") Such a CU 506 and DU 508 are also referred to here as an O-RAN CU 506 and an O-RAN DU 508, respectively. For example, for a given cell served by the open radio access network 400, a respective O-RAN CU 506 and O-RAN DU 508 for that cell can both be deployed at the site 408 or the O-RAN DU 508 for that cell can be deployed at the site 408 with the corresponding O-RAN CU for that cell deployed remotely from that site 408. Such O-RAN CUs 506 and O-RAN DUs 508 can be used to implement one or more of the wireless interface protocols supported by the O-RAN specifications (such as one or more 4G wireless interface protocols or one or more 5G wireless interface protocols).

In another 5G example shown in FIG. 5, the digital-interface base station nodes 504 include a 5G BBU 510 deployed at the site 408 without a corresponding RRH. The 5G BBU 510 supports a digital fronthaul interface typically used to provide 5G service, such as an evolved Common Public Radio Interface (eCPRI) interface.

The digital-interface base station nodes 504 can also be implemented using base station equipment typically used to provide 4G service. In one 4G example shown in FIG. 5, the digital-interface base station nodes 504 are implemented as or using a 4G BBU 513 deployed at the site 408 without a corresponding RRH. The 4G BBU 513 supports a digital fronthaul interface typically used in connection with providing 4G service such as a CPRI interface, an Open Radio Equipment Interface (ORI) interface, or an Open Base Station Standard Initiative ("OBSAI") interface.

Although some examples of digital-interface base station nodes 504 are described here as a "5G example" or a "4G example," it is to be understood that such digital-interface base station nodes 504 can be used to provide service using other wireless interface protocols in addition to or instead of 5G service or 4G service, respectively. For example, digital-interface base station nodes 504 described above in connection with a 5G example can be used to provide 4G service in addition to or instead of 5G service. Likewise, digital-interface base station nodes 504 described above in connection with a 4G example can be used to provide 5G service in addition to or instead of 4G service. Indeed, such examples can be used to implement any of the wireless interface protocols or any of the generations of radio access technology described here. Furthermore, it is also to be understood that 5G embodiments or examples can be used in standalone mode and/or non-standalone mode (or other modes developed in the future) and the description here is not intended to be limited to any particular mode.

As noted above, the virtualized headend 402, and the base station nodes 500 thereof, are communicatively coupled to the unified remote units 404 via a switched Ethernet network 406. In the exemplary embodiment described here in connection with FIGS. 4-5, the Internet Protocol (IP) is used for communicating fronthaul data between the virtualized headend 402 and the unified remote units 404. For those base-station nodes 500 that do not natively support communicating user-plane and control-plane data using IP packets, the virtualized headend 402 comprises an IP stream transceiver to convert the user-plane and control-plane data natively sent and received by those base-station nodes 500 to and from IP packets for communication over the switched Ethernet network 406. For example, as shown in FIG. 5, the virtualized headend 402 comprises an IP stream transceiver 512 for converting the analog RF signals natively sent and received by the one or more analog-RF-interface base station nodes 502 used to serve at least one cell to and from IP packets for communication over the switched Ethernet network 406. In one implementation, as a part of doing this, for each downlink analog RF signal output by the analog-RF-interface base station node 502 via the analog RF interface, the IP stream transceiver 512 receives that downlink analog RF signals and digitizes them to produce real digital samples. The IP stream transceiver 512 digitally down-converts the real digital samples to produce baseband digital in-phase and quadrature (IQ) samples. The IQ data can be further filtered to select a frequency band of interest. The resulting downlink IQ data for each band is packetized and communicated as user-plane IP packets to the unified remote units 404 serving the associated cell over the switched Ethernet network 406.

If it is determined that a packet received by a unified remote unit 404 from the IP stream transceiver 512 has one or more errors, the IQ data contained in the packet may be included or excluded from the subsequent processing that is performed to produce the downlink RF signals transmitted by that unified remote unit 404. This determination as to whether to include or exclude such IQ data may be done using an error handling algorithm. Criteria for excluding the IQ data can include how many errors are in the packet and how often errors are received from a specific IP stream transceiver 512 (or other network element). Also, if a high percentage of packets from a specific source are missing (that is, are not received when expected), then all packets from that source may be excluded from the subsequent processing until such packets are again regularly received from that source.

The IP stream transceiver 512 receives uplink user-plane IP packets sent from the unified remote units 404 serving the associated cell over the switched Ethernet network 406. The IP stream transceiver 512 extracts the uplink IQ data produced at those the unified remote units 404 for that band, time aligns the uplink IQ data from those unified remote units 404, and digitally sums corresponding IQ samples. The summing may also include scaling the uplink IQ data from one or more of the unified remote units 404 (that is, changing the gain of the some of the input uplink IQ data), scaling the resulting summed uplink IQ data (that is, changing the gain of the output summed uplink IQ data), or implementing some type of limiter so the summed uplink IQ data does not exceed the available bit-width of the IQ data. If it is determined that a packet received from a unified remote unit 404 has one or more errors, the IQ data contained in the packet may be included or excluded from the digital summing operation according to an error handling algorithm. Criteria for excluding the IQ data can include how many errors are in the packet and how often errors are received from that unified remote unit 404. Also, if a high percentage of packets from a unified remote unit 404 (or other network element) are missing (that is, are not received when expected), then all packets from that unified remote unit 404 may be excluded from the digital summing operation until such packets are again regularly received from that unified remote unit 404.

The resulting stream of summed uplink IQ samples are digitally up-converted and converted to an uplink analog RF signal that is communicated to the appropriate analog-RF-interface base station node 502 via its analog RF interface.

In the exemplary embodiment shown in FIG. 5, some of the digital-interface base station nodes 504 do not natively support communicating user-plane and control-plane data using IP packets (for example, those digital-interface base station nodes 504 that use a legacy CPRI interface for communicating fronthaul data). The virtualized headend 402 comprises an IP stream transceiver 514 for converting between the digital data natively sent and received by those digital-interface base station nodes 504 to and from IP packets for communication over the switched Ethernet network 406. Such conversion may include, for example, changing sample rates, changing bits per sample, changing from a synchronous interface to an asynchronous interface, or rate matching.

In one implementation, in the downlink, for each such digital-interface base station node 504, the IP stream transceiver 514 receives the corresponding digital downlink data, extracts the user-plane and control-plane data, and packetizes and communicates the user-plane data and any needed control-plane data as user-plane IP packets and control-plane IP packets, respectively, over the switched Ethernet network 406 to the unified remote units 404 serving the associated cell.

If it is determined that a packet received by a unified remote unit 404 from the IP stream transceiver 514 has one or more errors, the IQ data contained in the packet may be included or excluded from the subsequent processing that is performed to produce the downlink RF signals transmitted by that unified remote unit 404. This determination as to whether to include or exclude such IQ data may be done using an error handling algorithm. Criteria for excluding the IQ data can include how many errors are in the packet and how often errors are received from a specific IP stream transceiver 514 (or other network element). Also, if a high percentage of packets from a specific source are missing (that is, are not received when expected), then all packets from that source may be excluded from the subsequent processing until such packets are again regularly received from that source.

In the uplink, for each such digital-interface base station node 504, the IP stream transceiver 514 receives the user-plane and control-plane IP packets sent from the unified remote units 404 serving the associated cell. The IP stream transceiver 514 extracts the user-plane and control-plane data produced at those unified remote units 404. If necessary, the IP stream transceiver 514 time aligns the uplink IQ data included in the extracted user-plane data and digitally sums corresponding IQ samples. The summing may also include scaling the uplink IQ data from one or more of the unified remote units 404 (that is, changing the gain of the some of the input uplink IQ data), scaling the resulting summed uplink IQ data (that is, changing the gain of the output summed uplink IQ data), or implementing some type of limiter so the summed uplink IQ data does not exceed the available bit-width of the IQ data. If it is determined that a packet received from a unified remote unit 404 has one or more errors, the IQ data contained in the packet may be included or excluded from the digital summing operation according to an error handling algorithm. Criteria for excluding the IQ data can include how many errors are in the packet and how often errors are received from that unified remote unit 404. Also, if a high percentage of packets from a unified remote unit 404 (or other network element) are missing (that is, are not received when expected), then all packets from that unified remote unit 404 may be excluded from the digital summing operation until such packets are again regularly received from that unified remote unit 404.

The IP stream transceiver 514 then formats the resulting user-plane data and any needed control-plane data in accordance with the digital interface used by the digital-interface base station node 504 and communicates the user-plane and control-plane data to the digital-interface base station node 504 using its digital interface.

In one implementation, before digitally summing corresponding uplink IQ samples communicated from the unified remote units 404 serving a cell for each resource element (or other relevant unit), the IP stream transceivers 512 and 514 are configured to analyze the uplink IQ samples received from each individual unified remote unit 404 for that resource element (or other unit) to determine if those samples are actually conveying valid data transmitted from a UE. If the samples are not conveying valid data transmitted from a UE, the samples can be excluded from the digital summing process (for example, by zeroing out the samples or dropping the samples) or the values of the samples can be reduced. This analysis can be performed, for example, by comparing the samples to a threshold value, where the samples are considered to be conveying valid data if they are greater than the threshold value and are considered not to be conveying valid data if they are less than the threshold value. Other techniques can be used. In other implementations, this type of intelligent uplink summing process is not performed and instead corresponding uplink IQ samples communicated from the unified remote units 404 serving the associated cell are digitally summed regardless of whether or not the uplink IQ samples received from each individual unified remote unit 404 are actually conveying valid data transmitted from a UE.

The virtualized headend 402 further comprises a multi-function time synchronization server 516. The time synchronization server 516 provides an accurate time source for use in the open radio access network 400. In the example shown in FIG. 5, the accurate time source is developed using a global positioning system (GPS) receiver 518 that is coupled to an appropriately located antenna 520. The GPS clock reference output by the GPS receiver 518 is supplied to the time synchronization server 516. The accurate time source can be developed in other ways. For example, the time synchronization server 516 can be configured to synchronize its local clock to a master clock by communicating over a backhaul interface with a timing master using a time synchronization protocol such as the Network Time Protocol (NTP) and/or the Precision Time Protocol (PTP). The time synchronization server 516 is multi-function in the sense that it is configured to provide a common accurate time source to the heterogeneous base-station nodes 500 in different ways.

The time synchronization server 516 is configured to serve as a local accurate time source for any of the base-station nodes 500 deployed at the site 408 that needs such a source. For example, the time synchronization server 516 is configured to output a GPS clock reference output that appears as if it was supplied directly from a GPS receiver. Such a GPS clock reference output can be supplied to those base-station nodes 500 deployed at the site 408 that need such a source (for example, a BBU or femtocell or an O-RAN DU that is configured to normally serve as a timing master for the RAN). Also, in the example shown in FIG. 5, the IP stream transceivers 512 and 514 are coupled to the time synchronization server 516 and are configured to use the time synchronization server 516 as a local accurate time source. The time synchronization server 516 includes an appropriate interface to provide such a GPS clock reference output to those base-station nodes 500 that need it.

The time synchronization server 516 is also configured to serve as a timing master entity for any of the base-station nodes 500 that needs to synchronize itself to such an entity. For example, the time synchronization server 516 is configured to serve as an Institute of Electrical and Electronics Engineers (IEEE) 1588 Precision Time Protocol (PTP) and Synchronous Ethernet (SyncE) timing master entity and communicate with other devices in the open radio access network 400 that act as slave entities that synchronize their clocks to the clock of the time synchronization server 516 using the PTP or SyncE protocols. For example, the time synchronization server 516 can serve as a PTP or SyncE timing master entity those base-station nodes 500 that need such a master entity (for example, an O-RAN CU 506 or O-RAN DU 508 that is configured to act as a PTP or SyncE slave entity). Also, in the exemplary embodiment described here in connection with FIGS. 4 and 5, the unified remote units 404 are configured to act as PTP slave entities for which the time synchronization server 516 serves as a PTP timing master entity so that they can synchronize their clocks to the clock of the time synchronization server 516 using the PTP protocols. The time synchronization server 516 communicates such S-plane communications with the unified remote units 404 over the switched Ethernet network 406. Such S-plane communications between the time synchronization server 516 and the unified remotes units 404 can be communicated directly from the time synchronization server 516 or via an intermediary node (for example, via one or more of the IP stream transceivers 512 and 514). Moreover, one or more base-station nodes 500 can be configured to serve as a PTP or SyncE timing master entity for one or more other base-station nodes 500 and/or one or more of the unified remote units 404 (for example, an O-RAN DU 508 can be configured to serve as a PTP or SyncE timing master entity for such other base-station nodes 500 and/or one or more of the unified remote units 404).

The time synchronization server 516 is configured to use the same time base for serving as a local accurate time source and for serving a PTP and SyncE timing master entity. As a result, the various entities will be synchronized to the same time base, regardless of how those entities are synchronized.

The virtualized headend 402 further comprises a management system 522. The management system 522 is configured to manage the various elements of the open radio access network 400. The management system 522 is coupled to the various entities of the virtualized headend 402 via local connections and/or external networks (such as the Internet) and coupled to the unified remote units 404 via the switched Ethernet network 406. The management system 522 can also be coupled to remote management systems of the associated wireless service providers. The management system 522 is configured to communicate (via the M-plane) with the various entities of the open radio access network 400 using the management protocols supported by the those entities (for example, using open protocols such as the Technical Report 069 (TR-069) Protocol, the Network Configuration Protocol (NETCONF), and the Simple Network Management Protocol (SNMP) and/or using proprietary protocols).

As noted above, user-plane, control-plane, management-plane, and synchronization-plane packets are communicated to and from the unified remote units 404 over the switched Ethernet network 406. The respective user-plane and control-plane data for each cell served by the open radio access network 400 can be routed to any of the one or more unified remote units 404 using standard Ethernet and IP networking features (such as, for example, unicast, multicast, virtual local area network (VLAN), class of service (COS), and quality of service (QOS) features). Also, the switched Ethernet network 406 can be implemented using standard Ethernet cabling (for example, optical fiber cables, Ethernet CAT 5e or CAT-6, cables, etc.). Each of the base station nodes 500 (including the IP transceivers 512 and 514) that is directly coupled to the Ethernet network 406 includes one or more Ethernet interfaces (not shown) to which the Ethernet cabling used to couple that device to the switched Ethernet network 406 (more specifically, to a port of a switch in the Ethernet network 406) is attached. Each such Ethernet interface is configured for communicating over the switched Ethernet network 406.

FIG. 6 illustrates one exemplary embodiment of a unified remote unit 404 suitable for use in the open radio access network 400 of FIG. 4. As noted above, each unified remote unit 404 is communicatively coupled to one or more base station nodes 500 of the virtualized headend 402 via the switched Ethernet network 406. Each unified remote unit 404 includes an internal Ethernet switch 600 to couple that unified remote unit 404 to the switched Ethernet network 406. The internal Ethernet switch 600 in the unified remote unit 404 comprises one or more Ethernet interfaces to which the Ethernet cabling used to couple that unified remote unit 404 to the switched Ethernet network 406 (more specifically, to a port of an access switch in the Ethernet network 406) is attached.

Downlink packets transmitted from one or more base station nodes 500 of the virtual headend 402 to each unified remote unit 404 over the switched Ethernet network 406 are received at the unified remote unit 404 and are forwarded by the internal Ethernet switch 600 to the appropriate internal entities within the unified remote unit 404 for processing thereby. Likewise, uplink packets are output by the internal entities within the unified remote unit 404 to the internal Ethernet switch 600, which transmits the uplink packets to one or more base station nodes 500 of the virtual headend 402 over the switched Ethernet network 406.

The unified remote unit 404 includes a plurality of downlink multi-protocol processing blocks 604, a plurality of uplink multi-protocol processing blocks 606, a plurality of downlink radio modules 605, and a plurality of uplink radio modules 607.

Each downlink multi-protocol processing block 604 comprises multiple downlink signal paths 608, each of which is configured to process downlink baseband data received from one of the base station nodes 500 in the virtualized headend 402. Each uplink multi-protocol processing block 606 comprises multiple uplink signal paths 610, each of which is configured to process uplink baseband data to be transmitted to one of the base station nodes 500 of the virtualized headend 402. (Also, it should be noted that for some cells served by the open radio access network 400, a unified remote unit 404 is configured to operate as a single-node small cell, in which case the unified remote unit 404 does not communicate with a base station node 500 of the virtualized headend 402 but instead communicates with nodes in the service provider's core network.)

The downlink and uplink multi-protocol processing blocks 604 and 606 are "multi-protocol" in the sense that each block can be used to process digital data communicated to and from the virtual headend 402 (and the respective base station nodes 500) using multiple, different functional splits, possibly supporting different wireless interface protocols, different generations of radio access technology (for example, 2G, 3G, 4G, and 5G), and/or different frequency bands.

Each signal path 608 in each downlink multi-protocol processing block 604 comprises a respective IP packet receiver 612 that is coupled to a port of the internal Ethernet switch 600 and that is configured to perform the Ethernet, Internet Protocol (IP), and transport protocol (such as UDP) processing for the downlink packets provided from the Ethernet switch 600 to the IP packet receiver 612.

In one implementation (described in detail below), each IP packet receiver 612 has assigned to it a respective IP address and MAC address and the internal Ethernet switch 600 is configured to forward the downlink packets to the appropriate IP packet receiver 612 based on the IP address and MAC address included in each downlink packet. In such an implementation, the one or more base station nodes 500 that are serving a given cell can transmit downlink packets to a particular signal path 608 of a particular downlink multi-protocol processing block 604 by transmitting the downlink packets to the appropriate IP address and MAC address. In this implementation, non-real time control-plane data, management-plane data, and synchronization-plane data communicated to a particular signal path 608 is extracted and forwarded by that signal path 608 to the radio monitoring and management function 666 or the time synchronization slave 674 in that unified remote unit 404.

In another implementation, each IP packet receiver 612, radio monitoring and management function 666 (described below), and time synchronization slave 674 (described below) has assigned to it a respective IP address and MAC address. In such an implementation, the one or more base station nodes 500 that are serving a given cell can transmit user-plane downlink and real-time control-plane packets to a particular signal path 608 of a particular downlink multi-protocol processing block 604, can transmit non-real time control-plane and management-plane downlink packets to the radio monitoring and management function 666, and can transmit synchronization-plane downlink packets to the time synchronization slave 674 by transmitting the various types of downlink packets to the appropriate IP address and MAC address. The internal Ethernet switch 600 is configured to forward the downlink packets to the appropriate IP packet receiver 612 or the radio monitoring and management function 666 or the time synchronization slave 674 based on the IP address and MAC address included in each downlink packet.

In another implementation, each unified remote unit 404 has assigned to it only a single IP address and MAC address. In such an implementation, the internal Ethernet switch 600 is configured to perform deep packet inspection (DPI) for the downlink packets it receives in order to determine to which signal path 608 (and associated IP packet receiver 612) each downlink packet should be forwarded. For example, where the downlink packets are transmitted from an O-RAN DU 508, the internal Ethernet switch 600 can be configured to inspect the eCPRI or IEEE 1914.3 header included in the Ethernet payload of each downlink packet in order to determine to which signal path 608 (and associated IP packet receiver 612) each downlink packet should be forwarded. (IEEE 1914.3 refers to the IEEE standards for Radio over Ethernet (RoE) Encapsulations and Mappings.) Also, the IP stream transceivers 512 and 514 can be configured to re-format the payload of the downlink packets to facilitate the DPI performed by the internal Ethernet switch 600. With this implementation, the M-plane and S-plane downlink packets received from the virtualized headend 402 can be routed within the unified remote unit 404 based on the source MAC address included in those packets. If the source MAC address in a received downlink packet is a MAC address of an Ethernet interface used by the management system 522, the downlink packet will be routed to the radio monitoring and management function 666 in that unified remote unit 404. Likewise, if the source MAC address in a received downlink packet is a MAC address of an Ethernet interface used by the time synchronization server 516, the downlink packet will be routed to the time synchronization slave 674 in that unified remote unit 404.

Each signal path 608 in each downlink multi-protocol processing block 604 further comprises a respective deframer 614 that receives downlink data output by the respective IP packet receiver 612 and extracts the various types of data communicated (for example, user-plane data, control-plane data, synchronization-plane data, and management-plane data) based on the particular functional split (and fronthaul or backhaul transport protocol) that signal path 608 is configured to support. Also, for some functional splits, how the deframer 614 extracts the various types of data is dependent on scheduling information provided via the control-plane.

In this example, non-real time control-plane data, management-plane data, and synchronization-plane data communicated to that signal path 608 are forwarded to the radio monitoring and management function 666 or the time synchronization slave 674 in that unified remote unit 404.

Each signal path 608 in each downlink multi-protocol process block 604 also includes L3/L2/L1 processing functions 616 for the various functional splits, wireless interface protocols, and frequency bands supported by that downlink multi-protocol processing block 604. Each signal path 608 can be configured to implement a particular functional split, wireless interface protocol, and frequency band and the corresponding L3/L2/L1 processing functions 616 are used to process user-plane and real-time control-plane data communicated to that signal path 608 in connection with doing so. Also, for some functional splits, the processing performed by the L3/L2/L1 processing functions 616 is dependent on scheduling information provided via the control-plane. Moreover, scheduling information (and other control-plane information) relevant to uplink processing can be forwarded to the appropriate uplink signal path 610.

In one example, a signal path 608 can be configured to implement an Option 7-2 functional split as specified by the O-RAN Alliance for use with a 5GNR wireless interface in a sub-6 Ghz frequency band, in which case the L3/L2/L1 processing functions 616 in that signal path 608 are configured to perform the low 5GNR PHY functions (for example, resource element mapping, any beamforming, inverse fast Fourier transform (iFFT) processing, and cyclic prefix insertion) in order to produce time-domain baseband IQ data.

In another example, a signal path 608 can be configured to implement an Option 8 functional split as specified by the CPRI specifications for use with a 4G wireless interface in a sub-6 Ghz frequency band, in which case the L3/L2/L1 processing functions 616 in that signal path 608 are configured to perform no protocol-specific L3, L2, or L1 processing for the baseband data extracted by the deframer 614.

In yet another example, one or more signal paths 608 can be configured to implement a single-node 5GNR small cell gNB for use with a 5GNR wireless interface in a sub-6 Ghz frequency band, in which case the L3/L2/L1 processing functions 616 in each such signal path 608 are configured to perform all of the 5GNR L3, L2, and L1 functions for the cell served by that single-node 5GNR small cell gNB. In this example, the data communicated over the switched Ethernet network 406 (and extracted by the deframer 614) comprises downlink control-plane, user-plane, and management-plane backhaul data communicated from the core network of the associated wireless service provider using appropriate backhaul interfaces.

The signal paths 608 can be configured to implement different functional splits, wireless interfaces, and/or frequency bands.

Each signal path 608 in each downlink multi-protocol processing block 604 further comprises a respective time alignment first-in-first-out (FIFO) buffer 618. Each time alignment FIFO buffer 618 is configured to time align the resulting downlink time-domain IQ data produced in that signal path 608 with the time-base established by the time synchronization server 516 for the open radio access network 400 (and, as a result, with the downlink time-domain IQ data produced in the other signal paths 608 of the various downlink multi-protocol processing blocks 604). Each time alignment FIFO buffer 618 adjusts for different communication times from the virtualized headend 402 to the unified remote unit 404 over the switched Ethernet network 406 and different processing times through each signal path 608.

Each signal path 608 in each downlink multi-protocol processing block 604 further comprises a respective sample rate adaptation function 620. Each sample rate adaptation function 620 is configured to convert the resulting downlink time-domain IQ data produced in that signal path 608 to the input sample rate and resolution used by the downlink radio modules 605 (described below). For example, the processing performed in the signal path 608 for the particular wireless interface protocol that signal path 608 is configured to support may cause it to produce time-domain IQ data having a sample rate and/or sample resolution that differ from the input sample rate and resolution used by the radio modules 605, in which case the sample rate adaptation function 620 converts that time-domain IQ data so that it uses the required input sample rate and resolution.

The time-aligned and sample-rate adapted downlink time-domain IQ data output by each signal path 608 in each downlink multi-protocol processing block 604 can be supplied to any signal path 609 of any downlink radio module 605 via a downlink IQ stream switch 622. The downlink IQ stream switch 622 is configured to receive the time-aligned and sample-rate adapted downlink time-domain IQ data output by each signal path 608 in each downlink multi-protocol processing block 604 and supply it to the appropriate signal path 609 of the appropriate downlink radio module 605 under the control of the management and control plane functionality described below.

Each downlink radio module 605 comprises one or more signal paths 609. In the particular exemplary embodiment shown in FIG. 6, each downlink radio module 605 comprises a single signal path 609, though it is to be understood that each downlink radio module 605 can include more than one signal path 609.

Each signal path 609 in each downlink radio module 605 comprises a respective IQ summer/adder/combiner function 624 that is configured to digitally sum (or otherwise combine) different downlink time-domain IQ data streams output by different signal paths 608 of the downlink multi-protocol processing blocks 604. For example, different signal paths 608 can be used to produce downlink time-domain IQ data for different cells (that are served using different frequencies within the same wide frequency band), which are digitally summed in order to produce a single, combined IQ data stream for subsequent processing to produce an analog RF output including RF signals for the different cells.

Each signal path 609 in each downlink radio module 605 further comprises a respective sample rate conversion function 626 that converts the sample rate and/or resolution of the summed IQ data output by the summer/adder/combiner function 624 to match the input sample rate and/or resolution used by the digital-to-analog (DAC) converter 634 (described below). Each signal path 609 in each downlink radio module 605 further comprises a respective digital up conversion (DUC) function 628 that is configured to digitally upconvert the IQ data output by the sample rate conversion function 626. Each signal path 609 in each downlink radio module 605 further comprises crest-factor reduction (CFR) and digital pre-distortion (DPD) functions 630 for performing CFR and DPD processing for the up-converted IQ data output by the DUC function 628. The resulting IQ data is input to a digital-to-analog converter (DAC) 634 included in each signal path 609 of each downlink radio module 605. Each DAC 634 is configured to convert the digital IQ data to a composite analog signal (including the various constituent frequencies). The composite analog signal is upconverted to the appropriate RF band (if necessary), filtered, and power amplified by an RF/power amplifier (RF/PA) circuit 636 included in each signal path 609 in each downlink radio module 605. (The up-conversion to the appropriate RF band can be done via the DAC 634 directly outputting the composite analog signal in the appropriate RF band or via an analog upconverter included in the RF/PA circuit 636.) The resulting amplified composite analog RF signals output by the various signal paths 609 of the downlink radio modules 605 are input to an antenna circuit 638 that is coupled to the various antennas 640 associated with the unified remote unit 404. The various antennas 640 can be implemented as external antennas or as internal antennas.

For each antenna 640, the antenna circuit 638 is configured to combine the composite amplified analog RF signals output by a predetermined subset of the signal paths 609 of the downlink radio modules 605 (for example, using one or more band combiners) and to output the resulting combined signal via a duplexer to that antenna 640.

Each uplink radio module 607 comprises one or more signal paths 611. In the particular exemplary embodiment shown in FIG. 6, each uplink radio module 607 comprises a single signal path 611, though it is to be understood that each uplink radio module 607 can include more than one signal path 611.

For each antenna 640, the antenna circuit 638 is configured to receive uplink analog RF signals for a set of cells via a duplexer from the antenna 640. The uplink analog signals are split (for example, using one or more band splitters) in order to supply, to each of a predetermined subset of the signal paths 611 of the uplink radio modules 607, the respective uplink analog RF signals for that signal path 611.

Each signal path 611 in each uplink radio module 607 comprises a respective low noise amplifier/RF (LNA/RF) circuit 642 that is configured to low-noise amplify the uplink analog RF signals supplied to that signal path 611 and, if necessary, filter and, if necessary, down-convert the resulting signals to produce an intermediate frequency (IF) versions of those signals.

Each signal path 611 in each uplink radio module 607 further comprises a respective analog-to-digital converter (ADC) 644 that converts the analog signals output by the LNA/RF circuit 642 to real digital samples. (The ADC 644 can be implemented using a direct RF ADC that can receive and digitize RF signals, in which case no analog down-conversion is necessary.)

Each signal path 611 in each uplink radio module 607 further comprises an optional downlink signal cancellation function 646 that is configured to digitally cancel any of the corresponding downlink antenna signals output by the corresponding downlink radio module 605 or downlink intermodulation signals that have leaked into the uplink frequency band. To do this, digital samples indicative of the corresponding downlink antenna signals are produced by the RF/PA circuit 636 of the downlink radio module 605 that outputs those downlink antenna signals (for example, using a down-converter, filter, and ADC (not shown)). The digital samples for the corresponding downlink antenna signals, along with the digital samples for the uplink signals, are provided to the downlink signal cancellation function 646 so that the downlink signal cancellation function 646 can digitally cancel any of the corresponding downlink antenna or intermodulation signals that have leaked into the uplink signals. The downlink signal cancellation function 646 is optional and can be implemented, for example, using the techniques described in U.S. Pat. No. 10,103,802, which is hereby incorporated herein by reference.

The resulting real digital samples for the uplink link signals with the leakage signals cancelled (if that option is employed) are supplied to a digital down-converter (DDC) 648 included in that signal path 611 that digitally down-converts the real digital samples in order to produce digital baseband IQ samples. The digital baseband IQ samples are supplied to a sample rate conversion function 650 that converts the sample rate and/or resolution of the digital IQ samples output by the DDC 648 to match the input sample rate and/or resolution used by the IQ multiplexer function 652 (described below).

Each signal path 611 in each uplink radio module 607 comprises a respective IQ multiplexer function 652 that is configured to digitally filter the composite IQ sample stream output by the sample rate conversion function 650 in order to produce separate IQ data for the different cells (that are served using different frequencies within the same wide frequency band). Each separate stream of uplink IQ data output by the IQ multiplexer function 652 in each signal path 611 of any uplink radio module 607 can be supplied to any signal path 610 in any uplink multi-protocol processing block 606 via an uplink IQ stream switch 654. The uplink IQ stream switch 654 is configured to receive the IQ data output by each signal path 611 of any uplink radio module 607 and supply it to the appropriate signal path 610 of an uplink multi-protocol processing block 606 under the control of the management plane functionality described below.

Each signal path 610 in each uplink multi-protocol processing block 606 further comprises a respective sample rate adaptation function 656. Each sample rate adaptation function 656 is configured to convert the IQ data supplied to that signal path 610 to the input sample rate and resolution used in the uplink baseband processing performed in that signal path 610. For example, the IQ data produced by the radio modules 607 may have a sample rate and resolution that differ from the sample rate and resolution used in the uplink baseband processing performed in that signal path 610 for the particular wireless interface protocol that signal path 610 is configured to support, in which case the sample rate adaptation function 656 converts the supplied IQ data so that it uses the sample rate and resolution required for the uplink baseband processing.

Each signal path 610 in each uplink multi-protocol processing block 606 further comprises a respective latency control buffer 658. Each latency control buffer 658 is configured to buffer uplink IQ data so that it can be supplied to the subsequent uplink baseband processing functions in that signal path 610 at an appropriate rate. The appropriate rate for supplying the uplink IQ data to the subsequent uplink baseband processing functions depends on the particular functional split, wireless interface protocol, and frequency band that the signal patch 610 is configured to support at any point in time.

Each signal path 610 in each uplink multi-protocol process block 606 also includes L3/L2/L1 processing functions 660 for the various functional splits, wireless interface protocols, and frequency bands supported by that uplink multi-protocol processing block 606. Each signal path 610 can be configured to implement a particular functional split, wireless interface protocol, and frequency band and the corresponding L3/L2/L1 processing functions 660 are used to do so. Also, for some functional splits, the processing performed by the L3/L2/L1 processing functions 660 is dependent on scheduling information provided via the control-plane.

In one example, a signal path 610 can be configured to implement an Option 7-2 functional split as specified by the O-RAN Alliance for use with a 5GNR wireless interface in a sub-6 Ghz frequency band, in which case the L3/L2/L1 processing functions 660 in that signal path 610 are configured to perform the low 5GNR PHY functions (for example, cyclic prefix removal, fast Fourier transform (FFT) processing, port reduction, and resource element de-mapping) in order to produce uplink frequency-domain baseband IQ data.

In another example, a signal path 610 can be configured to implement an Option 8 functional split as specified by the CPRI specifications for use with a 4G wireless interface in a sub-6 Ghz frequency band, in which case the L3/L2/L1 processing functions 660 in that signal path 610 are configured to perform no protocol-specific L3, L2, or L1 processing for the baseband data supplied by the associated signal path 611 of the associated uplink radio module 607.

In yet another example, one or more signal paths 610 can be configured to implement a single-node 5GNR small cell gNB for use with a 5GNR wireless interface in a sub-6 Ghz frequency band, in which case the L3/L2/L1 processing functions 660 in each such signal path 610 are configured to perform all of the 5GNR L3, L2, and L1 functions for the cell served by that single-node 5GNR small cell gNB. In this example, the data communicated over the switched Ethernet network 406 (and produced by the L3/L2/L1 processing functions 660) comprises control-plane, user-plane, and management-plane backhaul data communicated to the core network of the associated wireless service provider using appropriate backhaul interfaces.

The signal paths 610 can be configured to implement different functional splits, wireless interfaces, and/or frequency bands.

Each signal path 610 in each uplink multi-protocol processing block 606 further comprises a respective framer 662 that receives uplink data produced by the L3/L2/L1 processing functions 660 and frames the uplink data in accordance with the particular functional split (and the particular fronthaul or backhaul transport protocol) that signal path 610 is configured to support and outputs the framed data. Also, for some functional splits, how the framer 662 frames the uplink data produced by the L3/L2/L1 processing functions 660 is dependent on scheduling information provided via the control-plane.

Each signal path 610 in each uplink multi-protocol processing block 606 comprises a respective IP packet transmitter 664 that is configured to perform the Ethernet, IP, and transport protocol (such as UDP) processing to produce uplink packets from the framed uplink data output by the framer 662. The IP packet transmitter 664 is coupled to a port of the internal Ethernet switch 600 for communicating the resulting uplink packets over the switched Ethernet network 406 to the one or more base-station nodes 500 of the virtualized headend 402.

Each unified remote unit 404 also includes management-plane functionality. In the embodiment shown in FIG. 6, each unified remote unit 404 includes a radio monitoring and management function 666 that communicates with the management system 522 in the virtualized headend 402 and processes any management-plane data communicated directly from the base station nodes 500 in the virtualized headend 402 as well as any non-real time control-plane and management-plane data forwarded to it from the various downlink signal paths 608. The radio monitoring and management function 666 comprises a framing/deframing configuration controller 668, a L3/L2/L1 configuration controller 670, and a timing-alignment controller 672. The framing/deframing configuration controller 668 is configured to control and configure the deframers 614 and framers 662 included in each signal path 608 and 610 of the downlink and uplink multi-protocol processing blocks 604 and block 606. The L3/L2/L1 configuration controller 670 is configured to control and configure the L3/L2/L1 functions 616 and 660 included in each signal path 608 and 610 of the downlink and uplink multi-protocol processing blocks 604 and block 606. The timing-alignment controller 672 is configured to control and configure the time alignment FIFO buffer 618 and latency control buffer 658 included in each signal path 608 and 610 of the downlink and uplink multi-protocol processing blocks 604 and 606.

The radio monitoring and management function 666 (and the framing/deframing configuration controller 668, the L3/L2/L1 configuration controller 670, and the timing-alignment controller 672 thereof) configure the various parts of the unified remote unit 404 as indicated by management-plane communications from the management system 522 in the virtualized headend 402.

The unified remote unit 404 also includes synchronization-plane functionality. In the embodiment shown in FIG. 6, each unified remote unit 404 includes a timing synchronization slave function 674 that communicates with the time synchronization server 516 in the virtualized headend 402. The timing synchronization slave function 674 is configured to synchronize itself (and a common local clock and clock distribution function 676 of the unified remote unit 404) to the time-base established by the time synchronization server 516 for the open radio access network 400. In the embodiment described here in connection with FIGS. 4-6, the timing synchronization slave function 674 is configured to synchronize itself to the time-base established by the time synchronization server 516 using the PTP or SyncE protocols. The common local clock and clock distribution function 676 is configured to provide local clock signals and data for the various parts of the unified remote unit 404.

The virtualized headend 402 and each unified remote unit 404 (and the functionality described as being included therein), as well as the open radio access system 400 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. The virtualized headend 402 and each unified remote unit 404, as well as the open radio access system 400 more generally, can be implemented in other ways. This includes, for example, variations in the content, sequence, and partitioning of the various functions and signal paths in each unified remote unit 404.

In the embodiment shown in FIG. 6, the antennas 640 are implemented using external antennas that are coupled to the unified remote units 404 using antenna circuit 638. In an alternative embodiment, at least some of the antennas 640 are implemented using antennas integrated into the radio modules 605 and 607 or elsewhere in each unified remote unit 404.

FIG. 7 illustrates one exemplary modular implementation of the unified remote unit 404 shown in FIG. 6. The modular implementation of the unified remote unit 404 shown in FIG. 7 is exemplary and it is to be understood that the unified remote unit 404 shown in FIG. 6 can be implemented in other ways.

In the exemplary modular implementation shown in FIG. 7, the unified remote unit 404 comprises a central digital board 700 and a plurality of radio boards 702. The central digital board 700 comprises one or more processing devices 704 (such as one or more field-programmable gate arrays (FPGAs)) that are used to implement the control-plane, user-plane, synchronization-plane, and management-plane functionality (including, for example, the downlink multi-protocol processing blocks 604 and the uplink multi-protocol processing blocks 606). The processing devices 704 are also used to implement parts of the internal Ethernet switch 600, the downlink IQ stream switch 622 and the uplink IQ stream switch 654.

Each radio board 702 is used to implement multiple downlink radio modules 605 and multiple uplink radio modules 607 as well as the parts of the downlink IQ stream switch 622 and the uplink IQ stream switch 654 not implemented in the central digital board 700. Each radio board 702 can also include at least a part of the antenna circuit 638 and can include, or be coupled to, one or more antennas 640.

Each radio board 702 comprises one or more processing devices 706 (such as one or more FPGAs) that are used to implement the parts of the downlink IQ stream switch 622 and the uplink IQ stream switch 654 not implemented in the central digital board 700 as well as the IQ summer/adder/combiner function 624, the sample rate conversion function 626, the DUC function 628, the CFR and DPD functions 630 of each downlink radio module 605 and the optional downlink signal cancellation function 646, the DDC 648, the sample rate conversion function 650, and the IQ multiplexer function 652 of each uplink radio module 607. In the exemplary implementation shown in FIG. 7, the DAC 634 and the RF/PA circuit 636 of each downlink radio module 605 and the LNA/RF circuit 642 and the ADC 644 of each uplink radio module 607 as well as the antenna circuit 638 and antennas 640 are implemented separately from the one or more processing devices 706 (shown in FIG. 7 as "DAC/ADC & RF CIRCUITS" 708). Some functions of the downlink multi-protocol processing blocks 604 and the uplink multi-protocol processing blocks 606 can also be implemented in the radio board 702.

In the exemplary embodiment shown in FIG. 7, the Ethernet interfaces of the internal Ethernet switch 600 used to couple the external ports of the internal Ethernet switch 600 to the switched Ethernet network 406 can be implemented using an Ethernet interface board 710 on which the Ethernet physical layer device 712 for each Ethernet interface is mounted. In this exemplary embodiment, the other functionality of the internal Ethernet switch 600 is implemented on the central digital board 700.

The central digital board 700 can be implemented as a backplane having appropriate backplane connectors to which the various radio boards 702 and Ethernet interface board 710 can be connected. This implementation is flexible in that a common central digital board 700 can be used with different radio boards 702 that are configured to support different frequency bands (for example, licensed frequency bands (including, for example, sub-6 GHz and mmWave frequency bands) and unlicensed frequency bands), wireless interface protocols (for example, 2G, 3G, 4G, 5G, TETRA, and WiFi protocols), duplexing schemes (for example, FDD and TDD), and output power classes (for example, 200 mW, 2 W, 20 W), as well as different Ethernet cabling. This enables a modular product platform to be created. For example, a unified remote unit 404 that supports multiple frequency bands and multiple wireless interface protocols can be assembled by connecting, to the central digital board 700, radio boards 702 that support the different frequency bands and wireless interface protocols. Also, individual radio boards 702 can be configured to support a lower-order MIMO schemes (such as a 2×2 MIMO or 4×4 MIMO), and multiple lower-order MIMO radio boards 702 can be used together to implement higher-order MIMO schemes (such as 4×4 MIMO or 8×8 MIMO). Typically, the non-software configurable, band-dependent, protocol-dependent, duplexing-scheme-dependent, and/or output-power-dependent devices and circuitry are included in the RF/PA circuit 636, the LNA/RF circuit 642, the antenna circuit 638, and antennas 640.

Moreover, the software-configurable parts of the unified remote unit 404 can be configured or reconfigured (for example, by configuring or re-configuring the currently-loaded software and/or by loading new software) in order to support different functional splits, different frequency bands, wireless interface protocols, and duplexing schemes. This configuration or re-configuration can occur at the time the unified remote unit 404 is assembled or tested (for example, by the manufacturer or system integrator), at the time the unified remote unit 404 is installed, or on-the-fly after installation.

FIG. 8 comprises a high-level flowchart illustrating one exemplary embodiment of a method 800 of transmitting downlink analog RF signals using the open radio access network 400. The embodiment of method 800 is described here as being implemented using the embodiment of the open radio access network 400 described above in connection with FIGS. 4-7, though other embodiments can be implemented in other ways.

The blocks of the flow diagram shown in FIG. 8 have been arranged in a generally sequential manner for ease of explanation; however, it is to be understood that this arrangement is merely exemplary, and it should be recognized that the processing associated with method 800 (and the blocks shown in FIG. 8) can occur in a different order (for example, where at least some of the processing associated with the blocks is performed in parallel and/or in an event-driven manner). Also, most standard exception handling is not described for ease of explanation; however, it is to be understood that method 800 can and typically would include such exception handling.

The embodiment of method 800 shown in FIG. 8 is described here as being performed for a particular cell served by the open radio access network 400, which is referred to here as the "current" cell.

Method 800 comprises performing processing, in accordance with the functional split, the wireless interface protocol, and the frequency band used for the current cell, to generate digital downlink fronthaul data for the current cell (block 802) and sending, over the switched Ethernet network 406, the digital downlink fronthaul data to the one or more unified remote units serving the current cell (block 804).

In a first example, the one or more base station nodes 500 serving the current cell comprise an analog-RF-interface base station 502 (more specifically, an RRH), a corresponding BBU, and an IP stream transceiver 512. In this example, the BBU performs the L3, L2, and L1 processing for the associated wireless interface protocol in order to generate digital downlink control-plane and user-plane data. The digital downlink control-plane and user-plane data is communicated to the RRH using an appropriate digital interface (for example, CPRI). The RRH generates downlink analog RF signals from the received digital downlink control-plane and user-plane data. The IP stream transceiver 512 that converts the downlink analog RF signals natively output by the RRH into time-domain digital baseband data encapsulated in IP packets that are communicated over the switched Ethernet network 406 to the one or more unified remote units 404 serving the associated cell.

In a second example, the one or more base station nodes 500 serving the current cell comprise a digital-interface base station node 504 (more specifically, an O-RAN DU 508). The one or more base stations nodes 500 may also include a corresponding O-RAN CU 506. The O-RAN CU 506 (if one is used to serve the current cell) and the O-RAN DU 508 perform the L3 and L2 processing and the high PHY functions of the L1 for the associated wireless interface protocol and outputs digital downlink user-plane frequency-domain digital IQ data and digital downlink control-plane messages and communicates them in IP packets over the switched Ethernet network 406 to the one or unified remote units 404 serving the current cell.

In a third example, the one or more base station nodes 500 serving the current cell comprise a digital-interface base station node 504 (more specifically, a CPRI BBU 510) and an IP stream transceiver 514. In this example, no corresponding CPRI RRH is used; instead, the one or more unified remote units 404 serving the current cell act as the RRH for that CPRI BBU 510. In this example, the CPRI BBU 510 performs the L3, L2, and L1 processing for the associated wireless interface protocol in order to generate digital downlink control-plane and user-plane data in the form of CPRI frames. The CPRI frames are communicated to the IP stream transceiver 514 using the CPRI interface. The IP stream transceiver 514 extracts the digital downlink control-plane and user-plane data from the CPRI frames output by the CPRI BBU 510 and encapsulates the extracted digital downlink control-plane and user-plane data in downlink control-plane and user-plane IP packets and communicates them over the switched Ethernet network 406 to the one or more unified remote units 404 serving the current cell.

Method 800 further comprises receiving by each unified remote unit 404 serving the current cell, from the switched Ethernet network 406, the digital downlink fronthaul data for the current cell (block 806), performing, by that unified remote unit 404, processing of the digital downlink fronthaul data for the current cell to generate downlink analog RF signals for the current cell (block 808), and wirelessly transmitting the downlink analog RF signals for the current cell from antennas 640 associated with that unified remote unit 404 (block 810). The processing of the digital downlink fronthaul data is performed in accordance with the functional split, the wireless interface protocol, and the frequency band used for the current cell.

Each unified remote unit 404 serving the current cell receives the digital downlink fronthaul data communicated to it over the switched Ethernet network 406 using one or more Ethernet interfaces of the internal Ethernet switch 600 in the unified remote unit 404.

In the exemplary embodiment described here in connection with the open radio access network 400 of FIGS. 4-7, one or more signal paths 608 of one or more downlink multi-protocol processing blocks 604 and one or more signal paths 609 of one or more downlink radio modules 605 of the unified remote unit 404 are used to generate downlink analog RF signals for serving the current cell.

In this example, the internal Ethernet switch 600 forwards each packet of digital downlink fronthaul data received from the one or more base station nodes 500 serving the current cell to the IP packet receiver 612 in the appropriate signal path 608 of the appropriate downlink multi-protocol processing block 604, which performs the Ethernet, IP, and transport protocol processing for the received packet. The deframer 614 in that signal path 608 receives the downlink data output by the IP packet receiver 612 in that signal path 608 and extracts the various types of data communicated based on the particular functional split (and fronthaul transport protocol) used for the current cell. In this example, the non-real time control-plane data, management-plane data, and synchronization-plane data communicated to that signal path 608 from the one or more base station nodes 500 are forwarded to the radio monitoring and management function 666 or the time synchronization slave 674 in the unified remote unit 404.

The L3/L2/L1 processing functions 616 in the signal path 608 receives the extracted downlink data output by the deframer 614 in that signal path 608 and performs the required processing for the particular functional split, wireless interface protocol, and frequency band used for the current cell. Also, for some functional splits, how the deframer 614 extracts the various types of data and/or the processing performed by the L3/L2/L1 processing functions 616 is dependent on scheduling information provided via the control-plane.

The resulting time-domain IQ data produced by the L3/L2/L1 processing functions 616 is further processed by the rest of the signal path 608. The time-aligned and sample-rate adapted time-domain IQ data output by each signal path 608 used to serve the current cell can be supplied to the appropriate signal path 609 of the appropriate downlink radio module 605 via the downlink IQ stream switch 622 (in accordance with a configuration determined via the management plane).

Each signal path 609 of each downlink radio module 605 used to serve the current cell receives each time-domain IQ data stream for the current cell supplied to that signal path 609 (as well as any other time-domain IQ data streams for other cells), digitally sums (or otherwise combines) such time-domain IQ data streams, and generates analog RF signals for serving the current cell (as well as any such other cells). The resulting analog RF signals are radiated for one or more antennas 640 associated with the unified remote unit 404.

FIG. 9 comprises a high-level flowchart illustrating one exemplary embodiment of a method 900 of receiving uplink analog RF signals using the open radio access network 400. The embodiment of method 900 is described here as being implemented using the embodiment of the open radio access network 400 described above in connection with FIGS. 4-7, though other embodiments can be implemented in other ways.

The blocks of the flow diagram shown in FIG. 9 have been arranged in a generally sequential manner for ease of explanation; however, it is to be understood that this arrangement is merely exemplary, and it should be recognized that the processing associated with method 900 (and the blocks shown in FIG. 9) can occur in a different order (for example, where at least some of the processing associated with the blocks is performed in parallel and/or in an event-driven manner). Also, most standard exception handling is not described for ease of explanation; however, it is to be understood that method 900 can and typically would include such exception handling.

The embodiment of method 900 shown in FIG. 9 is described here as being performed for a particular cell served by the open radio access network 400, which is referred to here as the "current" cell.

Method 900 comprises wirelessly receiving, by each unified remote unit 404 serving the current cell, uplink analog RF signals for the current cell via the antennas 640 associated with that unified remote unit 404 (block 902), performing, by that unified remote unit 404, processing of the uplink analog RF signals to generate digital uplink fronthaul data for the current cell (block 904), and sending, by that unified remote unit 404, the digital uplink fronthaul data for the current cell to the one or more base-station nodes 500 used to serve the current cell over the switched Ethernet network 406 (block 906). The processing of the uplink analog RF signals is performed in accordance with the functional split, the wireless interface protocol, and the frequency band used for the current cell.

In the exemplary embodiment described here in connection with the open radio access network 400 of FIGS. 4-7, one or more signal paths 610 of one or more uplink multi-protocol processing blocks 606 and one or more signal paths 611 of one or more uplink radio modules 607 of the unified remote unit 404 are used to receive and process uplink analog RF signals in order to serve the current cell.

Each signal path 611 of each uplink radio module 607 used to serve the current cell receives uplink analog RF signals for the current cell via one or more antennas 640 associated with the unified remote unit 404. The signal path 611 generates a time-domain IQ data stream from the received uplink analog RF signals, which is supplied to an appropriate signal path 610 of an appropriate uplink multi-protocol processing block 606 via the uplink IQ stream switch 654 (in accordance with a configuration determined via the management plane).

For each signal path 610 in each uplink multi-protocol processing block 606 used to serve the current cell, the time-domain IQ data provided to it is converted by the respective sample rate adaptation function 656 to have the input sample rate and resolution used in the uplink baseband processing performed in that signal path 610 and is buffered by the respective latency control buffer 658 so that it can be supplied to the subsequent uplink processing functions in the signal path 610 at an appropriate rate. The L3/L2/L1 processing functions 660 in the signal path 610 receive the uplink time-domain IQ data and perform the required processing for the particular functional split, wireless interface protocol, and frequency band used for the current cell. Also, for some functional splits, the processing performed by the L3/L2/L1 processing functions 660 is dependent on scheduling information provided via the control-plane, in which case the L3/L2/L1 configuration controller 670 in the unified remote unit 404 processes the corresponding control-plane data in order to determine such scheduling information and configure the L3/L2/L1 processing functions 660 appropriately.

For each signal path 610 in each uplink multi-protocol processing block 606 used to serve the current cell, the respective framer 662 frames the processed uplink data in accordance with the particular functional split (and the particular fronthaul transport protocol) that signal path 608 is configured to support and outputs the framed data. Also, for some functional splits, how the framer 662 frames the processed uplink data is dependent on scheduling information provided via the control-plane, in which case the framing/deframing configuration controller 668 in the unified remote unit 404 processes the corresponding control-plane data in order to determine such scheduling information and configure each framer 662 appropriately.

For each signal path 610 in each uplink multi-protocol processing block 606 used to serve the current cell, the respective IP packet transmitter 664 performs the Ethernet, IP, and transport protocol processing to produce uplink packets from the framed uplink data output by the framer 662. The IP packet transmitter 664 is coupled to a port of the internal Ethernet switch 600 for communicating the resulting uplink packets over the switched Ethernet network 406 to the associated one or more base-station nodes 500 of the virtualized headend 402.

Method 900 further comprises receiving, by the one or more base-station nodes 500 serving the current cell from the switched Ethernet network, the digital uplink fronthaul data for the current cell (block 908) and performing, by the one or more base-station nodes 500 serving the current cell, processing of the digital uplink fronthaul data for the current cell (block 910). The processing of the digital uplink fronthaul data is performed in accordance with the respective functional split, the respective wireless interface protocol, and the respective frequency band used for the current cell.

In a first example, the one or more base station nodes 500 serving the current cell comprise an analog-RF-interface base station 502 (more specifically, an RRH), a corresponding BBU, and an IP stream transceiver 512. For the functional split used in this example (Option 8), the one or more unified remote units 404 serving the current cell communicate time-domain digital IQ data encapsulated in IP packets to the virtualized headend 402. The IP stream transceiver 512 receives IP packets from the one or more unified remote units 404, extracts the time-domain digital IQ data for each antenna carrier, digitally sums corresponding IQ samples received for each antenna carrier from the various unified remote units 404, and converts the resulting stream of summed IQ samples for each antenna carrier to an uplink analog RF signal that is supplied to the RRH via the antenna interface of the RRH. For each antenna carrier, the RRH generates time-domain IQ data from the uplink analog RF signal supplied to the RRH. The RRH frames the resulting time-domain IQ data received for the various antenna carriers (along with appropriate control-plane, management-data plane, and synchronization-plane data) into uplink CPRI frames, which are communicated to the associated BBU. The BBU receives the CPRI frames, extracts the various types of data and performs the L3, L2, and L1 processing for the wireless interface protocol used to serve the current cell.

In a second example, the one or more base station nodes 500 serving the current cell comprise a digital-interface base station node 504 (more specifically, an O-RAN DU 508). The one or more base stations nodes 500 may also include a corresponding O-RAN CU 506. For the functional split used in this example (Option 7-2), the one or more unified remote units 404 serving the current cell generate uplink O-RAN user-plane and control-plane data in IP packets that are communicated to the O-RAN DU 508 of the virtualized headend 402. The O-RAN DU 508 receives the IP packets, extracts the various types of data and performs the high PHY functions of L1 for the wireless interface protocol used to serve the current cell, as well as any L2 and/or L3 processing not performed in the O-RAN CU 506 (if one is used). The resulting uplink data is communicated to the O-RAN CU 506 (if one is used), which performs the remaining L2 and/or L3 processing.

In a third example, the one or more base station nodes 500 serving the current cell comprise a digital-interface base station node 504 (more specifically, a CPRI BBU 510) and an IP stream transceiver 514. In this example, no corresponding CPRI RRH is used; instead, the one or more unified remote units 404 serving the current cell act as the RRH for that CPRI BBU 510. For the functional split used in this example (Option 8), the one or more unified remote units 404 serving the current cell communicate time-domain digital IQ data encapsulated in IP packets to the IP stream transceiver 514 of the virtualized headend 402. The IP stream transceiver 514 receives IP packets from the one or more unified remote units 404, extracts the time-domain digital IQ data for each antenna carrier, and digitally sums corresponding IQ samples for each antenna carrier received from the various unified remote units 404. The IP stream transceiver 514 frames the resulting summed time-domain IQ data received for the various antenna carriers (along with appropriate control-plane, management-data plane, and synchronization-plane data) into uplink CPRI frames, which are communicated to the CPRI BBU 510. The CPRI BBU 510 receives the CPRI frames, extracts the various types of data and performs the L3, L2, and L1 processing for the wireless interface protocol used to serve the current cell.

In the embodiments of methods 800 and 900 shown in FIGS. 8 and 9, one or more base-station nodes 500 of the virtualized headend 402, along with one or more unified remote units 404, are used to serve a cell. However, a unified remote unit 404 can also be configured to act as a single-node small cell base station to serve a cell. In that case, no separate base-station node 500 of the virtualized headend 402 is used to serve the cell. Backhaul downlink and uplink communications are communicated directly from the service provider's core network to the unified remote unit 404 over the switched Ethernet network 406.

FIG. 10 comprises a high-level flowchart illustrating one exemplary embodiment of a method 1000 of adapting the operation of an open radio access network. The embodiment of method 1000 is described here as being implemented using the embodiment of the open radio access network 400 described above in connection with FIGS. 4-7, though other embodiments can be implemented in other ways.

The blocks of the flow diagram shown in FIG. 10 have been arranged in a generally sequential manner for ease of explanation; however, it is to be understood that this arrangement is merely exemplary, and it should be recognized that the processing associated with method 1000 (and the blocks shown in FIG. 10) can occur in a different order (for example, where at least some of the processing associated with the blocks is performed in parallel and/or in an event-driven manner). Also, most standard exception handling is not described for ease of explanation; however, it is to be understood that method 1000 can and typically would include such exception handling.

Method 1000 comprises monitoring one or more performance attributes associated with the open radio access network 400 (block 1002), adapting the configuration of the open radio access network 400 based on the monitored performance attributes (block 1004), and operating the open radio access network 400 using the adapted configuration (block 1006).

In this exemplary embodiment, the management system 522 in the virtualized headend 402 and the radio monitoring and management function 666 in the unified remote units 404 can be configured to monitor performance attributes such as bandwidth and/or latency of the switched Ethernet network 406 used for communicating data between the virtualized headend 402 and the unified remote units 404 and/or processing load or throughput at the base-station nodes 500 and/or the unified remote units 404. The management system 522 in the virtualized headend 402 and the radio monitoring and management function 666 can do this monitoring directly (for example, by itself capturing the underlying data and making the necessary calculations), indirectly (for example, by communicating with other entities that have the underlying data and/or that make the necessary calculation), or combinations thereof.

The one or more monitored performance attributes can be checked to see if they indicate that a configuration change is needed. For example, if one or more monitored performance attributes do not satisfy threshold values established for the current configuration of the open radio access network 400, a configuration change may be needed.

For example, if the monitored bandwidth and/or latency of the switched Ethernet network 406 does not satisfy threshold values established for the current configuration of the open radio access network 400, the functional split used with one or more of the cells served by the open radio access network 400 can be changed to use a functional split that less bandwidth or latency intensive (for example, by changing the configuration for a cell that is currently being served by the open radio access network 400 using an Option 7-2 functional split to instead use an Option 2 functional split). This configuration change can be made if it is expected that the performance of the open radio access network 400 with the configuration change will still satisfy threshold values established for the other monitored performance attributes.

In another example, if the monitored processing load or performance of one or more unified remote units 404 does not satisfy threshold values established for the current configuration of the open radio access network 400, the functional split used with one or more of the cells served by the open radio access network 400 can be changed to use a functional split that less processing intensive (for example, by changing the configuration for a cell that is currently being served by the open radio access network 400 using an Option 7-2 functional split to instead use an Option 8 functional split). This configuration change can be made if it is expected that the performance of the open radio access network 400 with the configuration change will still satisfy threshold values established for the other monitored performance attributes.

This configuration adaptation can be done automatically or done manually.

FIG. 11 comprises a high-level flowchart illustrating one exemplary embodiment of a method 1100 of optimizing transport of fronthaul data using an Option 8 functional split and time-domain IQ data. The embodiment of method 1100 is described here as being implemented using the embodiment of the open radio access network 400 described above in connection with FIGS. 4-7. More specifically, the processing associated method 1100 can be implemented in one or more of the base-station nodes 500 (for example, in the IP stream transceiver 512 or 514) and the unified remote units 404 serving the relevant cell. Other embodiments can be implemented in other ways.

The blocks of the flow diagram shown in FIG. 11 have been arranged in a generally sequential manner for ease of explanation; however, it is to be understood that this arrangement is merely exemplary, and it should be recognized that the processing associated with method 1100 (and the blocks shown in FIG. 11) can occur in a different order (for example, where at least some of the processing associated with the blocks is performed in parallel and/or in an event-driven manner). Also, most standard exception handling is not described for ease of explanation; however, it is to be understood that method 1100 can and typically would include such exception handling.

Typically, when the Option 8 functional split is used for communicating data over the fronthaul, fronthaul data for the entire channel bandwidth is transported, regardless of whether any of the corresponding physical radio blocks (PRBs) are unallocated. For example, this has historically been the case with digital DAS deployments. This issue can become more pronounced in 5G New Radio (NR) radio access networks that support the use of "bandwidth parts." A bandwidth part is a contiguous set of physical resource blocks (PRBs) on a given carrier. By reducing the amount of bandwidth used to serve a UE, the amount of power used by the UE can be reduced. However, when the Option 8 functional split is used in a 5G NR RAN, fronthaul data for the entire channel bandwidth is typically transported regardless of whether bandwidth parts are used.

Transporting fronthaul data for the entire channel bandwidth regardless of whether any of the corresponding PRBs are unallocated increases the amount of fronthaul bandwidth that is used. Radiating RF signals for the unallocated PRBs can result in increased noise levels on those PRBs. This can also affect inter-cell interference coordination and the use of reserved regions on the channel bandwidth.

FIG. 11 illustrates one approach to dealing with this issue when an Option 8 functional split is used for transporting fronthaul data over the fronthaul network.

The processing associated with method 1100 is aligned to the transmit boundaries (that is, the transmit time interval (TTI), slot, and symbol).

Method 1100 comprises determining, for each TTI or slot, a received signal strength indicator (RSSI) value for the spectrum associated with each PRB of the channel bandwidth (block 1102). For the downlink, the IP stream transceiver 512 or 514 that is used with the BBU 503, 510, or 513 serving the associated cell can be configured to use the time-domain IQ data generated for the entire channel bandwidth to measure a RSSI value for the spectrum associated with each PRB of the channel bandwidth. Likewise, for the uplink, each unified remote unit 404 serving the associated cell can be configured to generate time-domain IQ data from the analog uplink RF signals received for the channel bandwidth and to use the time-domain IQ data for the entire channel bandwidth to measure a RSSI value for the spectrum associated with each PRB of the channel bandwidth.

In some implementations, the time-domain IQ data is converted to frequency-domain IQ data by performing a fast Fourier transform (FFT), and the resulting frequency-domain IQ data is used for determining the RSSI values and for filtering and transporting the IQ data (as described below). In such implementations, the filtered IQ data can be transported over the fronthaul network as frequency-domain IQ data, in which case an inverse FFT (iFFT) operation is performed at the receiving end in order to generate time-domain IQ data for subsequent processing. In other implementations, the time-domain IQ data is used for determining the RSSI values and for filtering and transporting the IQ data.

Method 1100 further comprises determining, for each TTI or slot, if each PRB of the channel bandwidth is allocated as a function of the associated RSSI value (block 1104). For example, the RSSI value for each PRB can be compared to a threshold value that is selected so that the RSSI value will be above the threshold value if the corresponding PRB is allocated and is selected so that the RSSI value will be below the threshold value if the corresponding PRB is unallocated. Optionally, a correlation between the corresponding time-domain IQ data for each PRB that is believed to be unallocated and the expected demodulation reference symbols (DMRSs) in an allocated PRBs can be calculated. If the correlation is sufficiently low (for example, determined using an associated correlation threshold value), then that PRB is considered to be unallocated for the associated TTI or slot. Otherwise, the PRB is considered to be allocated for the associated TTI or slot. This optional processing can be done in order to improve the accuracy of this determination.

Method 1100 further comprises bandpass filtering the IQ data to remove the spectrum associated with the unallocated PRBs and to pass the spectrum associated with the allocated PRBs (block 1106). For example, the spectrum associated with the channel bandwidth can be subdivided into chunks of spectrum, with each chunk including two PRBs (that is, the number of chunks will be equal to one-half the total number of PRBs for the channel bandwidth). In such an example, the IQ data can be filtered to pass the spectrum associated with each chunk that includes an allocated PRB and removes any chunks that do not include an allocated PRB. Optionally, the passband for each contiguous set of allocated PRBs (that is, for each BWP in the case of 5G NR) can be extended to include the spectrum associated with an additional PRB to account for any Doppler effect.

Method 1100 further comprises transporting, over the fronthaul, packets that include the filtered IQ data and information identifying which portions of the spectrum are being transported for the TTI or slot (block 1108). For example, the information identifying which portions of the spectrum are being transported can take the form of a bitmap, where each bit position is associated with each chunk of spectrum used for filtering. Each packet can include a portion of the filtered IQ data for the TTI or slot along with a header that includes a bitmap. The bit positions in the bitmap are set for any chunks that are associated with the filtered IQ data included in the associated packet.

In the downlink direction, the IP stream transceiver 512 or 514 serving the associated cell generates the packets that include the filtered IQ data and bitmaps identifying which chunks are being transported and transmits them over the fronthaul to the various unified remote units 404 serving that cell. In the uplink direction, each unified remote unit 404 serving the associated cell generates the packets that include the filtered IQ data and bitmaps identifying which chunks are being transported and transmits them over the fronthaul to the IP stream transceiver 512 or 514 serving that cell.

Method 1100 further comprises receiving the transported packets for the TTI or slot (block 1110) and using the filtered IQ data for the portions of the spectrum transported for the TTI or slot (block 1112). For example, in the downlink direction, each unified remote unit 404 receives the downlink packets transmitted from the respective IP stream transceiver 512 or 514, extracts the filtered IQ data for the chunks of spectrum transported for the TTI or slot (as indicated by a bitmap included in a header of the packets), generates RF signals from the extract filtered IQ data for only the indicated chunks of spectrum and amplifies and radiates the RF signals. Likewise, in the uplink direction, each IP stream transceiver 512 or 514 receives the uplink packets transmitted from each unified remote unit 404 serving the associated cell, extracts the filtered IQ data for the chunks of spectrum transported for the TTI or slot (as indicated by a bitmap included in a header of the packets), and combines the corresponding IQ samples (for example, by digitally summing them). Where the IP stream transceiver 512 interfaces with a RRH 505 via an analog RF interface, the IP stream transceiver 512 generates analog RF signals for the channel bandwidth and outputs the analog RF signals to the RRH 505 via the analog RF interface. Where the IP stream transceiver 514 interfaces directly with a BBU 510 or 513 via the digital baseband interface, the IP stream transceiver 514 generates time-domain IQ samples for the entire channel bandwidth in the format expected by the associated BBU 510 or 513 and outputs them to the BBU 510 or 513 via the digital baseband interface.

Transporting fronthaul data only for the allocated PRBs reduces the amount of fronthaul bandwidth that is used. Also, only RF signals for the allocated PRBs can be radiated, resulting in reduced noise levels on the unallocated PRBs. This can also improve inter-cell interference coordination and the use of reserved regions on the channel bandwidth.

The open radio access network described here makes use of flexible unified remote units, where each unified remote unit can serve multiple cells simultaneously using multiple wireless interface protocols, multiple generations of radio access technology (for example, 2G, 3G, 4G, and 5G), multiple frequency bands, and/or multiple functional splits. This provides a flexible solution that can be adapted to changes in the number and/or types of services provided at a site and/or the switched Ethernet network at the site.

Moreover, the modular implementation of a unified remote unit described above enables a manufacturer or system integrator to easily assemble unified remote units that support different combinations of wireless interface protocols, frequency bands, and functional splits. Also, such a modular implementation enables a deployed unified remote unit to be easily and flexibly upgraded in the field to support a different wireless interface protocol, frequency band, or functional splits by changing or reconfiguring the software and/or radio boards used in the unified remote unit.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes an open radio access network to provide wireless coverage for a plurality of cells at a site, the open radio access network comprising: a virtualized headend comprising one or more base-station nodes; and a plurality of unified remote units deployed at the site, each of which is associated with one or more antennas to wirelessly transmit and receive downlink and uplink radio frequency (RF) signals to and from user equipment; wherein the plurality of unified remote units are configured to communicate with the one or more base-station nodes using a switched Ethernet network; and wherein each unified remote unit comprises multiple downlink processing signal paths, multiple uplink processing signal paths, multiple downlink radio signal paths, and multiple uplink radio signal paths configured to support multiple fronthaul splits, multiple wireless interface protocols, multiple generations of radio access technology, and multiple frequency bands.

Example 2 includes the open radio access network of Example 1, wherein, for each of at least some cells served by the open radio access network using a respective functional split, a respective wireless interface protocol, and a respective frequency band: the virtualized headend comprises a respective one or more base-station nodes to serve that cell; a respective one or more unified remote units are used to serve that cell; the respective one or more base-station nodes serving that cell are configured to: perform processing, in accordance with the respective functional split, the respective wireless interface protocol, and the respective frequency band used for that cell, to generate respective digital downlink fronthaul data for that cell; send, over the switched Ethernet network, the respective digital downlink fronthaul data to the respective one or more of the unified remote units serving that cell; each of the respective one or more unified remote units serving that cell are configured to: receive, from the switched Ethernet network, the respective digital downlink fronthaul data for that cell; perform processing, in accordance with the respective functional split, the respective wireless interface protocol, and the respective frequency band used for that cell, of the respective digital downlink fronthaul data for that cell to generate respective downlink analog RF signals for that cell; and wirelessly transmit the respective downlink analog RF signals for that cell from the antennas used associated with that unified remote unit; each of the respective one or more unified remote units used to serve that cell are configured to: wirelessly receive respective uplink analog RF signals for that cell via the antennas associated with that unified remote unit; perform processing, in accordance with the respective functional split, the respective wireless interface protocol, and the respective frequency band used for that cell, of the respective uplink analog RF signals to generate respective digital uplink fronthaul data for that cell; send, over the switched Ethernet network, the respective digital uplink fronthaul data for that cell to the one or more base-station nodes used to serve that cell; and the respective one or more base-station nodes serving that cell are configured to: receive, from the switched Ethernet network, the respective digital uplink fronthaul data for that cell; perform processing, in accordance with the respective functional split, the respective wireless interface protocol, and the respective frequency band used for that cell, of the respective digital uplink fronthaul data for that cell.

Example 3 includes the open radio access network of any of Examples 1-2, wherein at least one of the unified remote units is configured to: serve a first cell using a first functional split; and serve a second cell using a second functional split; and wherein the first functional split differs from the second functional split.

Example 4 includes the open radio access network of any of Examples 1-3, wherein at least one of the unified remote units is configured to: serve a first cell using a first wireless interface protocol; and serve a second cell using a second wireless interface protocol; and wherein the first wireless interface protocol differs from the second wireless interface protocol.

Example 5 includes the open radio access network of any of Examples 1-4, wherein at least one of the unified remote units is configured to: serve a first cell using a first frequency band; and serve a second cell using a second frequency band; and wherein the first frequency band differs from the second frequency band.

Example 6 includes the open radio access network of any of Examples 1-5, wherein each of the unified remote units comprises: a plurality of downlink multi-protocol modules, each of which including a plurality of the downlink processing signal paths; a plurality of uplink multi-protocol modules, each of which including a plurality of the uplink processing signal paths; a plurality of downlink radio modules, each of which including at least one of the downlink radio signal paths; a plurality of uplink radio modules, each of which including at least one of the uplink radio signal paths; a downlink in-phase and quadrature (IQ) stream switch to couple each downlink radio signal path to a respective one or more downlink processing signal paths; an uplink in-phase and quadrature (IQ) stream switch to couple each uplink processing signal path to a respective one or more uplink radio signal paths; control-plane functionality to process control-plane communications; management-plane functionality to process management-plane communications; and synchronization-plane functionality to process synchronization-plane communications in order to synchronize that unified remote unit to a master time base for the open radio access network.

Example 7 includes the open radio access network of any of Examples 1-6, wherein one or more base-station nodes used to serve at least one cell comprises: a baseband unit (BBU); a remote radio head (RRH) coupled to the BBU and configured to transmit downlink analog RF signals and receive uplink analog RF signals for the cell; an Internet Protocol (IP) transceiver configured to: receive the downlink analog RF signals, digitize the downlink analog RF signals to produce downlink digital data, produce IP packets for sending over the switched Ethernet network to the respective one or more of the unified remote units serving that cell; and receive IP packets sent over the switched Ethernet network from the respective one or more of the unified remote units serving that cell, extract uplink digital data from the IP packets, convert the uplink digital data to the uplink analog RF signals, and provide the uplink analog RF signals to the RRH.

Example 8 includes the open radio access network of Example 7, wherein the BBU and the RRH are configured to use at least one of the following front-haul interfaces: a Common Public Radio Interface (CPRI), an evolved Common Public Radio Interface (eCPRI), an Open Radio Equipment Interface (ORI), or an Open Base Station Standard Initiative (OBSAI) interface.

Example 9 includes the open radio access network of any of Examples 1-8, wherein one or more base-station nodes used to serve at least one cell comprises: an Open Radio Access Network Alliance (O-RAN) distributed unit (DU) that is configured to: perform at least some processing to generate respective digital downlink user-plane and control-plane fronthaul data for that cell and send, over the switched Ethernet network, the respective digital downlink user-plane and control-plane fronthaul data to the respective one or more of the unified remote units serving that cell; and receive, from the switched Ethernet network, respective digital uplink user-plane and control-plane fronthaul data for that cell and perform at least some of the processing of the respective digital uplink user-plane and control-plane fronthaul data for that cell.

Example 10 includes the open radio access network of Example 9, wherein the respective one or more base-station nodes used to serve at least one cell further comprises an O-RAN central unit (CU).

Example 11 includes the open radio access network of any of Examples 1-10, wherein one or more base-station nodes used to serve at least one cell comprises: a baseband unit (BBU) to send downlink frames of digital downlink user-plane and control-plane data and receive frames of digital uplink frames of uplink user-plane and control-plane data; and an Internet Protocol (IP) transceiver configured to: receive the downlink frames, extract the digital downlink user-plane and control-plane data from the downlink frames, encapsulate the digital downlink user-plane and control-plane data in IP packets for sending over the switched Ethernet network to the respective one or more of the unified remote units serving that cell; and receive IP packets sent over the switched Ethernet network from the respective one or more of the unified remote units serving that cell, extract the digital uplink user-plane and control-plane data from the IP packets, frame the digital uplink user-plane and control-plane data in the uplink frames, and provide the uplink frames to the BBU.

Example 12 includes the open radio access network of Example 11, wherein the BBU is configured to use at least one of the following front-haul interfaces: a Common Public Radio Interface (CPRI), an evolved Common Public Radio Interface (eCPRI), an Open Radio Equipment Interface (ORI), or an Open Base Station Standard Initiative (OBSAI) interface.

Example 13 includes the open radio access network of any of Examples 1-12, wherein for at least one cell served by the open radio access network, at least one of the unified remote units is configured to operate as a single-node small cell base station.

Example 14 includes the open radio access network of any of Examples 1-13, wherein each unified remote unit is implemented in a modular manner using a central backplane to which various radio boards are coupled.

Example 15 includes the open radio access network of any of Examples 1-14, wherein the open access radio network is configured to, for at least one cell served by the open access radio network, change the functional split used to serve that cell.

Example 16 includes the open radio access network of Example 15, wherein the functional split is changed manually or automatically.

Example 17 includes the open radio access network of any of Examples 1-16, wherein the open access radio network is configured to: monitor at least one performance attribute associated with the open access radio network; and adapt the configuration of the open access radio network based on the monitored performance attribute.

Example 18 includes the open radio access network of any of Examples 1-17, wherein the open access radio network is configured so that, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

Example 19 includes a unified remote unit for use in an open radio access network to provide wireless coverage for a plurality of cells at a site, the open radio access network comprising a virtualized headend comprising one or more base-station nodes, the unified remote unit comprising: multiple downlink processing signal paths; multiple uplink processing signal paths; multiple downlink radio signal paths; and multiple uplink radio signal paths; wherein the unified remote unit is configured to communicate with the one or more base-station nodes using a switched Ethernet network; and wherein the multiple downlink processing signal paths, the multiple uplink processing signal paths, the multiple downlink radio signal paths, and the multiple uplink radio signal paths are configured to support multiple front haul splits to communicate user-plane and control-plane transport data to and from base-station nodes and to support multiple wireless interface protocols, multiple generations of radio access technology, and frequency bands for wirelessly communicating with the user equipment.

Example 20 includes the unified remote unit of Example 19, wherein, for each of at least some cells served by the open radio access network using a respective functional split, a respective wireless interface protocol, and a respective frequency band, the unified remote unit is configured to: receive, from the switched Ethernet network, respective digital downlink fronthaul data for that cell transmitted from a respective one or more base-station nodes serving that cell; perform processing, in accordance with the respective functional split, the respective wireless interface protocol, and the respective frequency band used for that cell, of the respective digital downlink fronthaul data for that cell to generate respective downlink analog RF signals for that cell; wirelessly transmit the respective downlink analog RF signals for that cell from antennas associated with that unified remote unit; wirelessly receive respective uplink analog RF signals for that cell via the antennas associated with that unified remote unit; perform processing, in accordance with the respective functional split, the respective wireless interface protocol, and the respective frequency band used for that cell, of the respective uplink analog RF signals to generate respective digital uplink fronthaul data for that cell; and send, over the switched Ethernet network, the respective digital uplink fronthaul data for that cell to the one or more base-station nodes used to serve that cell.

Example 21 includes the unified remote unit of any of Examples 19-20, wherein the unified remote unit is configured to: serve a first cell using a first functional split; and serve a second cell using a second functional split; and wherein the first functional split differs from the second functional split.

Example 22 includes the unified remote unit of any of Examples 19-21, wherein the unified remote unit is configured to: serve a first cell using a first wireless interface protocol; and serve a second cell using a second wireless interface protocol; and wherein the first wireless interface protocol differs from the second wireless interface protocol.

Example 23 includes the unified remote unit of any of Examples 19-22, wherein the unified remote unit is configured to: serve a first cell using a first frequency band; and serve a second cell using a second frequency band; and wherein the first frequency band differs from the second frequency band.

Example 24 includes the unified remote unit of any of Examples 19-23, wherein the unified remote unit is configured to: a plurality of downlink multi-protocol modules, each of which including a plurality of the downlink processing signal paths; a plurality of uplink multi-protocol modules, each of which including a plurality of the uplink processing signal paths; a plurality of downlink radio modules, each of which including at least one of the downlink radio signal paths; a plurality of uplink radio modules, each of which including at least one of the uplink radio signal paths; a downlink in-phase and quadrature (IQ) stream switch to couple each downlink radio signal path to a respective one or more downlink processing signal paths; an uplink in-phase and quadrature (IQ) stream switch to couple each uplink processing signal path to a respective one or more uplink radio signal paths; control-plane functionality to process control-plane communications; management-plane functionality to process management-plane communications; and synchronization-plane functionality to process synchronization-plane communications in order to synchronize that unified remote unit to a master time base for the open radio access network.

Example 25 includes the unified remote unit of any of Examples 19-24, wherein for at least one cell served by the open radio access network, at least one of the unified remote units is configured to operate as a single-node small cell base station.

Example 26 includes the unified remote unit of any of Examples 19-25, wherein the unified remote unit is implemented in a modular manner using a central backplane to which various radio boards are coupled.

Example 27 includes the unified remote unit of any of Examples 19-26, wherein the unified remote unit is configured so that, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

Example 28 includes a method of providing wireless coverage for a plurality of cells at a site using an open radio access network comprising a virtualized headend comprising one or more base-station nodes and a plurality of unified remote units deployed at the site, each of which is associated with one or more antennas to wirelessly transmit and receive downlink and uplink radio frequency (RF) signals to and from user equipment, the method comprising, for each of at least some cells served by the open radio access network using a respective functional split, a respective wireless interface protocol, and a respective frequency band: by a respective one or more base-station nodes serving that cell: performing processing, in accordance with the respective functional split, the respective wireless interface protocol, and the respective frequency band used for that cell, to generate respective digital downlink fronthaul data for that cell; and sending, over a switched Ethernet network, the respective digital downlink fronthaul data to the respective one or more of the unified remote units serving that cell; by each of a respective one or more unified remote units serving that cell: receiving, from the switched Ethernet network, the respective digital downlink fronthaul data for that cell; performing processing, in accordance with the respective functional split, the respective wireless interface protocol, and the respective frequency band used for that cell, of the respective digital downlink fronthaul data for that cell to generate respective downlink analog RF signals for that cell; and wirelessly transmitting the respective downlink analog RF signals for that cell from antennas associated with that unified remote unit; by each of the respective one or more unified remote units used to serve that cell: wirelessly receiving respective uplink analog RF signals for that cell via the antennas associated with that unified remote unit; performing processing, in accordance with the respective functional split, the respective wireless interface protocol, and the respective frequency band used for that cell, of the respective uplink analog RF signals to generate respective digital uplink fronthaul data for that cell; and sending, over the switched Ethernet network, the respective digital uplink fronthaul data for that cell to the one or more base-station nodes used to serve that cell; and by the respective one or more base-station nodes serving that cell: receiving, from the switched Ethernet network, the respective digital uplink fronthaul data for that cell; and performing processing, in accordance with the respective functional split, the respective wireless interface protocol, and the respective frequency band used for that cell, of the respective digital uplink fronthaul data for that cell.

Example 29 includes the method of Example 28, wherein for at least one cell served by the open radio access network, at least one of the unified remote units is configured to operate as a single-node small cell base station.

Example 30 includes the method of any of Examples 28-29, wherein at least one of the unified remote units is configured to: serve a first cell using a first functional split; and serve a second cell using a second functional split; and wherein the first functional split differs from the second functional split.

Example 31 includes the method of any of Examples 28-30, wherein at least one of the unified remote units is configured to: serve a first cell using a first wireless interface protocol; and serve a second cell using a second wireless interface protocol; and wherein the first wireless interface protocol differs from the second wireless interface protocol.

Example 32 includes the method of any of Examples 28-31, wherein at least one of the unified remote units is configured to: serve a first cell using a first frequency band; and serve a second cell using a second frequency band; and wherein the first frequency band differs from the second frequency band.

Example 33 includes the method of any of Examples 28-32, wherein the open access radio network is configured to, for at least one cell served by the open access radio network, change the functional split used to serve that cell.

Example 34 includes the method of Example 33, wherein the functional split is changed manually or automatically.

Example 35 includes the method of any of Examples 28-34, further comprising: monitoring at least one performance attribute associated with the open access radio network; and adapting the configuration of the open access radio network based on the monitored performance attribute.

Example 36 includes the method of any of Examples 28-35, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

What is claimed is:

1. An open radio access network to provide wireless coverage for a plurality of cells at a site, the open radio access network comprising:
   a virtualized headend comprising one or more base-station nodes; and
   a plurality of unified remote units deployed at the site, each of which is associated with one or more antennas to wirelessly transmit and receive downlink and uplink radio frequency (RF) signals to and from user equipment;
   wherein the plurality of unified remote units is configured to communicate with the one or more base-station nodes using a switched Ethernet network; and
   wherein each unified remote unit comprises multiple downlink processing signal paths, multiple uplink processing signal paths, multiple downlink radio signal paths, and multiple uplink radio signal paths configured to support multiple fronthaul splits, multiple wireless interface protocols, multiple generations of radio access technology, and multiple frequency bands.

2. The open radio access network of claim 1, wherein, for each of at least some cells served by the open radio access network using a respective functional split, a respective wireless interface protocol, and a respective frequency band:
   the virtualized headend comprises a respective one or more base-station nodes to serve that cell;
   a respective one or more unified remote units are used to serve that cell;
   the respective one or more base-station nodes serving that cell are configured to:
      perform processing, in accordance with the respective functional split, the respective wireless interface protocol, and the respective frequency band used for that cell, to generate respective digital downlink fronthaul data for that cell;

send, over the switched Ethernet network, the respective digital downlink fronthaul data to the respective one or more of the unified remote units serving that cell;

each of the respective one or more unified remote units serving that cell are configured to:
  receive, from the switched Ethernet network, the respective digital downlink fronthaul data for that cell;
  perform processing, in accordance with the respective functional split, the respective wireless interface protocol, and the respective frequency band used for that cell, of the respective digital downlink fronthaul data for that cell to generate respective downlink analog RF signals for that cell; and
  wirelessly transmit the respective downlink analog RF signals for that cell from the antennas used associated with that unified remote unit;

each of the respective one or more unified remote units used to serve that cell are configured to:
  wirelessly receive respective uplink analog RF signals for that cell via the antennas associated with that unified remote unit;
  perform processing, in accordance with the respective functional split, the respective wireless interface protocol, and the respective frequency band used for that cell, of the respective uplink analog RF signals to generate respective digital uplink fronthaul data for that cell;
  send, over the switched Ethernet network, the respective digital uplink fronthaul data for that cell to the one or more base-station nodes used to serve that cell; and the respective one or more base-station nodes serving that cell are configured to:
  receive, from the switched Ethernet network, the respective digital uplink fronthaul data for that cell;
  perform processing, in accordance with the respective functional split, the respective wireless interface protocol, and the respective frequency band used for that cell, of the respective digital uplink fronthaul data for that cell.

3. The open radio access network of claim 1, wherein at least one of the unified remote units is configured to:
  serve a first cell using a first functional split; and
  serve a second cell using a second functional split; and
  wherein the first functional split differs from the second functional split.

4. The open radio access network of claim 1, wherein at least one of the unified remote units is configured to:
  serve a first cell using a first wireless interface protocol; and
  serve a second cell using a second wireless interface protocol; and
  wherein the first wireless interface protocol differs from the second wireless interface protocol.

5. The open radio access network of claim 1, wherein at least one of the unified remote units is configured to:
  serve a first cell using a first frequency band; and
  serve a second cell using a second frequency band; and
  wherein the first frequency band differs from the second frequency band.

6. The open radio access network of claim 1, wherein each of the unified remote units comprises:
  a plurality of downlink multi-protocol modules, each of which including a plurality of the downlink processing signal paths;
  a plurality of uplink multi-protocol modules, each of which including a plurality of the uplink processing signal paths;
  a plurality of downlink radio modules, each of which including at least one of the downlink radio signal paths;
  a plurality of uplink radio modules, each of which including at least one of the uplink radio signal paths;
  a downlink in-phase and quadrature (IQ) stream switch to couple each downlink radio signal path to a respective one or more downlink processing signal paths;
  an uplink in-phase and quadrature (IQ) stream switch to couple each uplink processing signal path to a respective one or more uplink radio signal paths;
  control-plane functionality to process control-plane communications;
  management-plane functionality to process management-plane communications; and
  synchronization-plane functionality to process synchronization-plane communications in order to synchronize that unified remote unit to a master time base for the open radio access network.

7. The open radio access network of claim 1, wherein one or more base-station nodes used to serve at least one cell comprises:
  a baseband unit (BBU);
  a remote radio head (RRH) coupled to the BBU and configured to transmit downlink analog RF signals and receive uplink analog RF signals for the cell;
  an Internet Protocol (IP) transceiver configured to:
    receive the downlink analog RF signals, digitize the downlink analog RF signals to produce downlink digital data, produce IP packets for sending over the switched Ethernet network to the respective one or more of the unified remote units serving that cell; and
    receive IP packets sent over the switched Ethernet network from the respective one or more of the unified remote units serving that cell, extract uplink digital data from the IP packets, convert the uplink digital data to the uplink analog RF signals, and provide the uplink analog RF signals to the RRH.

8. The open radio access network of claim 7, wherein the BBU and the RRH are configured to use at least one of the following front-haul interfaces: a Common Public Radio Interface (CPRI), an evolved Common Public Radio Interface (eCPRI), an Open Radio Equipment Interface (ORI), or an Open Base Station Standard Initiative (OBSAI) interface.

9. The open radio access network of claim 1, wherein one or more base-station nodes used to serve at least one cell comprises:
  an Open Radio Access Network Alliance (O-RAN) distributed unit (DU) that is configured to:
    perform at least some processing to generate respective digital downlink user-plane and control-plane fronthaul data for that cell and send, over the switched Ethernet network, the respective digital downlink user-plane and control-plane fronthaul data to the respective one or more of the unified remote units serving that cell; and
    receive, from the switched Ethernet network, respective digital uplink user-plane and control-plane fronthaul data for that cell and perform at least some of the processing of the respective digital uplink user-plane and control-plane fronthaul data for that cell.

10. The open radio access network of claim 9, wherein the respective one or more base-station nodes used to serve at least one cell further comprises an O-RAN central unit (CU).

11. The open radio access network of claim 1, wherein one or more base-station nodes used to serve at least one cell comprises:
a baseband unit (BBU) to send downlink frames of digital downlink user-plane and control-plane data and receive frames of digital uplink frames of uplink user-plane and control-plane data; and
an Internet Protocol (IP) transceiver configured to:
receive the downlink frames, extract the digital downlink user-plane and control-plane data from the downlink frames, encapsulate the digital downlink user-plane and control-plane data in IP packets for sending over the switched Ethernet network to the respective one or more of the unified remote units serving that cell; and
receive IP packets sent over the switched Ethernet network from the respective one or more of the unified remote units serving that cell, extract the digital uplink user-plane and control-plane data from the IP packets, frame the digital uplink user-plane and control-plane data in the uplink frames, and provide the uplink frames to the BBU.

12. The open radio access network of claim 11, wherein the BBU is configured to use at least one of the following front-haul interfaces: a Common Public Radio Interface (CPRI), an evolved Common Public Radio Interface (eCPRI), an Open Radio Equipment Interface (ORI), or an Open Base Station Standard Initiative (OBSAI) interface.

13. The open radio access network of claim 1, wherein for at least one cell served by the open radio access network, at least one of the unified remote units is configured to operate as a single-node small cell base station.

14. The open radio access network of claim 1, wherein each unified remote unit is implemented in a modular manner using a central backplane to which various radio boards are coupled.

15. The open radio access network of claim 1, wherein the open access radio network is configured to, for at least one cell served by the open access radio network, change the functional split used to serve that cell.

16. The open radio access network of claim 15, wherein the functional split is changed manually or automatically.

17. The open radio access network of claim 1, wherein the open access radio network is configured to:
monitor at least one performance attribute associated with the open access radio network; and
adapt the configuration of the open access radio network based on the monitored performance attribute.

18. The open radio access network of claim 1, wherein the open access radio network is configured so that, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

19. A unified remote unit for use in an open radio access network to provide wireless coverage for a plurality of cells at a site, the open radio access network comprising a virtualized headend comprising one or more base-station nodes, the unified remote unit comprising:
multiple downlink processing signal paths;
multiple uplink processing signal paths;
multiple downlink radio signal paths; and
multiple uplink radio signal paths;
wherein the unified remote unit is configured to communicate with the one or more base-station nodes using a switched Ethernet network; and
wherein the multiple downlink processing signal paths, the multiple uplink processing signal paths, the multiple downlink radio signal paths, and the multiple uplink radio signal paths are configured to support multiple front haul splits to communicate user-plane and control-plane transport data to and from base-station nodes and to support multiple wireless interface protocols, multiple generations of radio access technology, and frequency bands for wirelessly communicating with the user equipment.

20. The unified remote unit of claim 19, wherein, for each of at least some cells served by the open radio access network using a respective functional split, a respective wireless interface protocol, and a respective frequency band, the unified remote unit is configured to:
receive, from the switched Ethernet network, respective digital downlink fronthaul data for that cell transmitted from a respective one or more base-station nodes serving that cell;
perform processing, in accordance with the respective functional split, the respective wireless interface protocol, and the respective frequency band used for that cell, of the respective digital downlink fronthaul data for that cell to generate respective downlink analog RF signals for that cell;
wirelessly transmit the respective downlink analog RF signals for that cell from antennas associated with that unified remote unit;
wirelessly receive respective uplink analog RF signals for that cell via the antennas associated with that unified remote unit;
perform processing, in accordance with the respective functional split, the respective wireless interface protocol, and the respective frequency band used for that cell, of the respective uplink analog RF signals to generate respective digital uplink fronthaul data for that cell; and
send, over the switched Ethernet network, the respective digital uplink fronthaul data for that cell to the one or more base-station nodes used to serve that cell.

21. The unified remote unit of claim 19, wherein the unified remote unit is configured to:
serve a first cell using a first functional split; and
serve a second cell using a second functional split; and
wherein the first functional split differs from the second functional split.

22. The unified remote unit of claim 19, wherein the unified remote unit is configured to:
serve a first cell using a first wireless interface protocol; and
serve a second cell using a second wireless interface protocol; and
wherein the first wireless interface protocol differs from the second wireless interface protocol.

23. The unified remote unit of claim 19, wherein the unified remote unit is configured to:
serve a first cell using a first frequency band; and
serve a second cell using a second frequency band; and
wherein the first frequency band differs from the second frequency band.

24. The unified remote unit of claim 19, wherein the unified remote unit is configured to:

a plurality of downlink multi-protocol modules, each of which including a plurality of the downlink processing signal paths;
a plurality of uplink multi-protocol modules, each of which including a plurality of the uplink processing signal paths;
a plurality of downlink radio modules, each of which including at least one of the downlink radio signal paths;
a plurality of uplink radio modules, each of which including at least one of the uplink radio signal paths;
a downlink in-phase and quadrature (IQ) stream switch to couple each downlink radio signal path to a respective one or more downlink processing signal paths;
an uplink in-phase and quadrature (IQ) stream switch to couple each uplink processing signal path to a respective one or more uplink radio signal paths;
control-plane functionality to process control-plane communications;
management-plane functionality to process management-plane communications; and
synchronization-plane functionality to process synchronization-plane communications in order to synchronize that unified remote unit to a master time base for the open radio access network.

25. The unified remote unit of claim 19, wherein for at least one cell served by the open radio access network, at least one of the unified remote units is configured to operate as a single-node small cell base station.

26. The unified remote unit of claim 19, wherein the unified remote unit is implemented in a modular manner using a central backplane to which various radio boards are coupled.

27. The unified remote unit of claim 19, wherein the unified remote unit is configured so that, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

28. A method of providing wireless coverage for a plurality of cells at a site using an open radio access network comprising a virtualized headend comprising one or more base-station nodes and a plurality of unified remote units deployed at the site, each of which is associated with one or more antennas to wirelessly transmit and receive downlink and uplink radio frequency (RF) signals to and from user equipment, the method comprising, for each of at least some cells served by the open radio access network using a respective functional split, a respective wireless interface protocol, and a respective frequency band:
by a respective one or more base-station nodes serving that cell:
performing processing, in accordance with the respective functional split, the respective wireless interface protocol, and the respective frequency band used for that cell, to generate respective digital downlink fronthaul data for that cell; and
sending, over a switched Ethernet network, the respective digital downlink fronthaul data to the respective one or more of the unified remote units serving that cell;
by each of a respective one or more unified remote units serving that cell:
receiving, from the switched Ethernet network, the respective digital downlink fronthaul data for that cell;
performing processing, in accordance with the respective functional split, the respective wireless interface protocol, and the respective frequency band used for that cell, of the respective digital downlink fronthaul data for that cell to generate respective downlink analog RF signals for that cell; and
wirelessly transmitting the respective downlink analog RF signals for that cell from antennas associated with that unified remote unit;
by each of the respective one or more unified remote units used to serve that cell:
wirelessly receiving respective uplink analog RF signals for that cell via the antennas associated with that unified remote unit;
performing processing, in accordance with the respective functional split, the respective wireless interface protocol, and the respective frequency band used for that cell, of the respective uplink analog RF signals to generate respective digital uplink fronthaul data for that cell; and
sending, over the switched Ethernet network, the respective digital uplink fronthaul data for that cell to the one or more base-station nodes used to serve that cell; and
by the respective one or more base-station nodes serving that cell:
receiving, from the switched Ethernet network, the respective digital uplink fronthaul data for that cell; and
performing processing, in accordance with the respective functional split, the respective wireless interface protocol, and the respective frequency band used for that cell, of the respective digital uplink fronthaul data for that cell.

29. The method of claim 28, wherein for at least one cell served by the open radio access network, at least one of the unified remote units is configured to operate as a single-node small cell base station.

30. The method of claim 28, wherein at least one of the unified remote units is configured to:
serve a first cell using a first functional split; and
serve a second cell using a second functional split; and
wherein the first functional split differs from the second functional split.

31. The method of claim 28, wherein at least one of the unified remote units is configured to:
serve a first cell using a first wireless interface protocol; and
serve a second cell using a second wireless interface protocol; and
wherein the first wireless interface protocol differs from the second wireless interface protocol.

32. The method of claim 28, wherein at least one of the unified remote units is configured to:
serve a first cell using a first frequency band; and
serve a second cell using a second frequency band; and
wherein the first frequency band differs from the second frequency band.

33. The method of claim 28, wherein the open access radio network is configured to, for at least one cell served by the open access radio network, change the functional split used to serve that cell.

34. The method of claim 33, wherein the functional split is changed manually or automatically.

35. The method of claim 28, further comprising:
monitoring at least one performance attribute associated with the open access radio network; and adapting the configuration of the open access radio network based on the monitored performance attribute.

36. The method of claim 28, when at least one base-station node is configured to use a fronthaul split that communicates time-domain IQ samples, at least some of the time-domain IQ samples are filtered to remove IQ data for unallocated physical resource blocks and pass IQ data for allocated physical resource blocks.

37. A method of providing wireless coverage to user equipment for a plurality of cells at a site using a unified remote unit in an open radio access network, the open radio access network comprising a virtualized headend comprising one or more base-station nodes, the method comprising:

using multiple downlink processing signal paths and multiple downlink radio signal paths in the unified remote unit to implement multiple front haul splits for communicating downlink user-plane and control-plane transport data with the base-station nodes to support multiple wireless interface protocols, multiple generations of radio access technology, and frequency bands for wirelessly communicating with the user equipment; and using multiple uplink processing signal paths and multiple uplink radio signal paths in the unified remote unit to implement the multiple front haul splits for communicating uplink user-plane transport data with the base-station nodes to support the multiple wireless interface protocols, the multiple generations of the radio access technology, and the frequency bands for wirelessly communicating with the user equipment.

38. The method of claim 37, wherein using the multiple downlink processing signal paths and multiple downlink radio signal paths in the unified remote unit to implement the multiple front haul splits for communicating the downlink user-plane and control-plane transport data with the base-station nodes to support the multiple wireless interface protocols, the multiple generations of radio access technology, and the frequency bands for wirelessly communicating with the user equipment comprise, for each of at least some cells served by the open radio access network using a respective functional split, a respective wireless interface protocol, and a respective frequency band:

receiving, from the switched Ethernet network, respective digital downlink fronthaul data for that cell transmitted from a respective one or more base-station nodes serving that cell;

performing processing, in accordance with the respective functional split, the respective wireless interface protocol, and the respective frequency band used for that cell, of the respective digital downlink fronthaul data for that cell to generate respective downlink analog RF signals for that cell; and wirelessly transmitting the respective downlink analog RF signals for that cell from antennas associated with the unified remote unit.

39. The method of claim 37, wherein using the multiple uplink processing signal paths and multiple uplink radio signal paths in the unified remote unit to implement the multiple front haul splits for communicating the uplink user-plane transport data with the base-station nodes to support the multiple wireless interface protocols, the multiple generations of the radio access technology, and the frequency bands for wirelessly communicating with the user equipment comprises, for each of at least some cells served by the open radio access network using a respective functional split, a respective wireless interface protocol, and a respective frequency band:

wirelessly receiving respective uplink analog RF signals for that cell via antennas associated with the unified remote unit;

performing processing, in accordance with the respective functional split, the respective wireless interface protocol, and the respective frequency band used for that cell, of the respective uplink analog RF signals to generate respective digital uplink fronthaul data for that cell; and sending, over the switched Ethernet network, the respective digital uplink fronthaul data for that cell to the one or more base-station nodes used to serve that cell.

* * * * *